US012761984B2

(12) United States Patent
Gerstner et al.

(10) Patent No.: US 12,761,984 B2
(45) Date of Patent: Oct. 13, 2026

(54) LOCAL AND REMOTE EVENT HANDLING

(71) Applicant: Branch Metrics, Inc., Palo Alto, CA (US)

(72) Inventors: Alexander Gerstner, Redmond, WA (US); Usman Shafique, Campbell, CA (US); Amardeep Singh Chawla, Seattle, WA (US); Myung Sun Kim, Seattle, WA (US); Charles Gilliam, Seattle, WA (US)

(73) Assignee: Branch Metrics, Inc., Palo Alto, CA (US)

( * ) Notice: Subject to any disclaimer, the term of this patent is extended or adjusted under 35 U.S.C. 154(b) by 546 days.

(21) Appl. No.: 18/446,777

(22) Filed: Aug. 9, 2023

(65) Prior Publication Data

US 2024/0054030 A1 Feb. 15, 2024

Related U.S. Application Data

(60) Provisional application No. 63/396,706, filed on Aug. 10, 2022.

(51) Int. Cl.
*G06F 9/54* (2006.01)
*H04L 67/10* (2022.01)

(52) U.S. Cl.
CPC .............. *G06F 9/542* (2013.01); *H04L 67/10* (2013.01)

(58) Field of Classification Search
CPC ................................. G06F 9/542; H04L 67/10
(Continued)

(56) References Cited

U.S. PATENT DOCUMENTS 7,769,767 B2 8/2010 Petersen
10,067,752 B1 9/2018 Dukes et al.
(Continued)

FOREIGN PATENT DOCUMENTS

KR 20140089543 A 7/2014
WO 2013070687 A1 5/2013

OTHER PUBLICATIONS

Advertising ID—Developer Console Help, Internet Archive—Wayback Machine, https://web.archive.org/ web/20161217180225/ https://support.google.com/googleplay/android-developer/answer/ 6048248?hl=en, dated Dec. 17, 2016, accessed on Aug. 6, 2018, 2 pages.

(Continued)

*Primary Examiner* — Tuan C Dao
(74) *Attorney, Agent, or Firm* — RMCK Law Group PLC

(57) ABSTRACT

A user device executes a partner application including a partner application module. The module acquires a first set of events associated with user actions in the partner application. The module reports a first subset of the first set of events to a remote computing system. The module refrains from reporting a second subset to the remote system based on satisfaction of initial event capping conditions that indicate which events should not be reported to the remote system. The module receives updated event capping conditions from the remote system that are different than the initial conditions, acquires a second set of events, and reports a first subset of the second set to the remote system. The module refrains from reporting a second subset of the second set to the remote system based on satisfaction of the updated conditions. The remote system reports the first subsets to a partner device.

20 Claims, 15 Drawing Sheets

(58) Field of Classification Search
USPC .......................................................... 719/318
See application file for complete search history.

(56) References Cited

U.S. PATENT DOCUMENTS

| | | | | |
|---|---|---|---|---|
| 10,091,312 | B1 | 10/2018 | Khanwalkar et al. | |
| 10,423,691 | B1 | 9/2019 | Patel et al. | |
| 2002/0141337 | A1* | 10/2002 | Grandin | H04Q 3/0087 370/231 |
| 2003/0030675 | A1* | 2/2003 | Ku | G06F 3/048 715/788 |
| 2006/0161395 | A1* | 7/2006 | Beam | G05B 23/027 702/185 |
| 2007/0027951 | A1* | 2/2007 | Motoyama | H04L 67/125 709/203 |
| 2008/0034424 | A1* | 2/2008 | Overcash | H04L 63/1416 726/22 |
| 2008/0274716 | A1* | 11/2008 | Fok | H04W 12/08 455/410 |
| 2009/0287433 | A1* | 11/2009 | Houston | H04W 52/0258 702/62 |
| 2012/0101952 | A1* | 4/2012 | Raleigh | H04L 12/1417 709/223 |
| 2012/0106329 | A1* | 5/2012 | Ahmed | H04W 4/00 370/230 |
| 2013/0061129 | A1* | 3/2013 | Liu | H04N 21/8543 709/224 |
| 2013/0124309 | A1 | 5/2013 | Traasdahl et al. | |
| 2013/0246089 | A1* | 9/2013 | Gross | G16H 40/63 705/2 |
| 2013/0267791 | A1* | 10/2013 | Halperin | A61B 5/0002 600/300 |
| 2013/0275195 | A1 | 10/2013 | Gabryelski et al. | |
| 2014/0129733 | A1 | 5/2014 | Klais et al. | |
| 2014/0187890 | A1* | 7/2014 | Mensinger | A61B 5/0004 600/365 |
| 2014/0214916 | A1 | 7/2014 | Gokul | |
| 2014/0258872 | A1* | 9/2014 | Spracklen | H04L 41/5067 715/736 |
| 2015/0117174 | A1* | 4/2015 | Alber | G11B 17/00 369/53.41 |
| 2015/0156061 | A1 | 6/2015 | Saxena et al. | |
| 2016/0055133 | A1 | 2/2016 | Look et al. | |
| 2016/0142858 | A1 | 5/2016 | Molinet et al. | |
| 2016/0373588 | A1* | 12/2016 | Raleigh | H04L 12/1407 |
| 2018/0025086 | A1 | 1/2018 | Malkin et al. | |
| 2018/0239658 | A1* | 8/2018 | Whitner | G06F 11/3409 |
| 2020/0073981 | A1* | 3/2020 | Pilkington | G06F 11/2268 |
| 2020/0081930 | A1 | 3/2020 | Currimbhoy et al. | |
| 2020/0264685 | A1* | 8/2020 | Jondu | G08B 29/18 |
| 2020/0394194 | A1 | 12/2020 | Glover et al. | |
| 2021/0042315 | A1 | 2/2021 | Glover et al. | |
| 2022/0319304 | A1* | 10/2022 | Menzel | G08B 29/185 |

OTHER PUBLICATIONS

Apple IDFA: A Primer for Marketers, https://apsalar.com/2015/06/all-about-idfa/, dated Jun. 30, 2015, accessed on Aug. 6, 2018, 4 pages.

Friedenthal, A., "5 Lessons Learned in Site Retargeting," website archived on Dec. 23, 2017, https://web.archive.org/web/20171223134610/https://www.softwareadvice.com/resources/5-lessons-learned-site-retargeting/, accessed on Aug. 28, 2018, 4 pages.

Google launches In Apps . . . pdf—article published Aug. 30, 2016. Accessed on Jan. 12, 2022 at website: https://searchengineland.com/google-in-apps-search-257884.

How to Use Spotlight Search on Your iPhone or iPad—article published Sep. 20, 2015. Accessed on Jan. 12, 2022 at website: https://www.howtogeek.com/229060/how-to-use-spotlight-search-on-your-iphone-or-ipad/.

HTTP cookie from Wikipedia, Internet Archive—Wayback Machine, https://web.archive.org/web/20161231030710/https://en.wikipedia.org/wiki/HTTP_cookie dated Dec. 31, 2016, accessed on Aug. 6, 2018, 18 pages.

PCT International Search Report and Written Opinion dated Jul. 26, 2018 for PCT International Application No. PCT/US2018/031375, 12 pages.

Wikipedia, "Behavioral retargeting," website archived on May 26, 2017, https://web.archive.org/web/20170526165029/https://en.wikipedia.org/wiki/Behavioral_retargeting, accessed on Aug. 28, 2018, 2 pages.

Wikipedia, "Dynamic Creative," website archived on Nov. 21, 2016, https://web.archive.org/web/20161121151105/https://en.wikipedia.org/wiki/Dynamic_creative, accessed on Aug. 28, 2018, 1 page.

Wikipedia, "Site retargeting," website archived on Mar. 27, 2017, https://web.archive.org/web/20170327080616/https://en.wikipedia.org/wiki/Site_retargeting, accessed on Aug. 28, 2018, 1 page.

* cited by examiner

LOCAL AND REMOTE EVENT HANDLING

CROSS-REFERENCE TO RELATED APPLICATION

This application claims the benefit of U.S. Provisional Application No. 63/396,706, filed on Aug. 10, 2022. The disclosure of the above application is incorporated herein by reference in its entirety.

FIELD

The present disclosure relates to handling application events and web events across multiple computing platforms and applications.

BACKGROUND

Software developers can develop websites and applications that are accessed by users on a variety of different platforms, such as different computing devices and operating systems. Example applications/websites may include e-commerce applications, social media applications, and business review applications. In some cases, the applications and websites can include similar content. Some software developers may want to persuade users to download and use their application, as their application may provide a more custom/advanced user experience than their website. In some cases, developers and other parties may acquire analytics regarding the acquisition and usage of their applications and websites so that they can gain a better understanding of how their applications are acquired and used on the different platforms. The acquired analytics may be used to provide/enhance some services, such as search and advertisement services. When acquiring analytics data, developers and other parties may implement private and secure systems that are designed to safeguard data and user identity.

SUMMARY

In one example, a system comprises a remote computing system and a user device. The user device is configured to execute a partner application including a partner application module. The partner application module is configured to acquire a first set of partner application events, wherein each partner application event of the first set of partner application events is associated with a user action in the partner application. The partner application module is configured to report a first subset of the first set of partner application events to the remote computing system. The partner application module is configured to refrain from reporting a second subset of the first set of partner application events to the remote computing system based on satisfaction of initial event capping conditions that indicate conditions upon which a partner application event should not be reported to the remote computing system. The partner application module is configured to receive updated event capping conditions from the remote computing system that are different than the initial event capping conditions, acquire a second set of partner application events after receiving the updated event capping conditions, and report a first subset of the second set of partner application events to the remote computing system. The partner application module is configured to refrain from reporting a second subset of the second set of partner application events to the remote computing system based on satisfaction of the updated event capping conditions. The remote computing system is configured to report the first subset of the first set of partner application events and the first subset of the second set of partner application events to a partner device.

In one example, a system comprises a first non-transitory computer-readable medium comprising first computer-readable instructions configured to be included in a partner application on a user device. The first computer-readable instructions cause a processing unit of the user device to acquire a first set of partner application events, wherein each partner application event of the first set of partner application events is associated with a user action in the partner application. The first computer-readable instructions cause the processing unit of the user device to report a first subset of the first set of partner application events to a remote computing system and refrain from reporting a second subset of the first set of partner application events to the remote computing system based on satisfaction of initial event capping conditions that indicate conditions upon which a partner application event should not be reported to the remote computing system. The first computer-readable instructions cause the processing unit of the user device to receive updated event capping conditions from the remote computing system that are different than the initial event capping conditions, acquire a second set of partner application events after receiving the updated event capping conditions, and report a first subset of the second set of partner application events to the remote computing system. The first computer-readable instructions cause the processing unit of the user device to refrain from reporting a second subset of the second set of partner application events to the remote computing system based on satisfaction of the updated event capping conditions. A second non-transitory computer-readable medium comprises second computer-readable instructions configured to cause a processing unit of the remote computing system to report the first subset of the first set of partner application events and the first subset of the second set of partner application events to a partner device.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
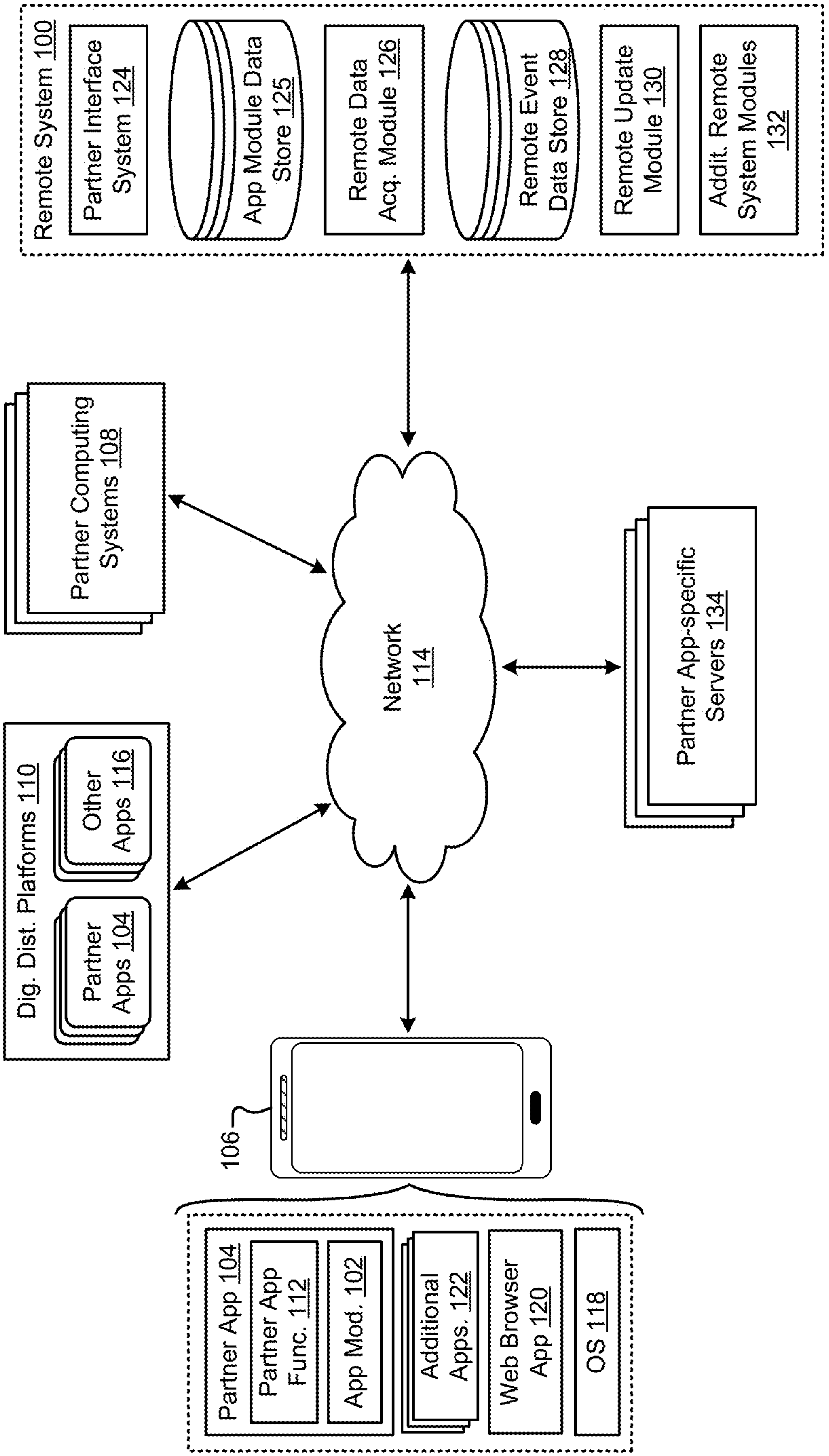
FIG. 1 illustrates an environment that includes a remote system that may provide application modules to partners for insertion into partner applications that execute on user devices.

FIG. 1 illustrates an environment that includes a remote computing system 100 ("remote system 100") (e.g., one or more server computing devices) that may provide application modules 102 (referred to as "partner application modules" or "app modules") to partners (e.g., application developers) for insertion into partner applications 104 that execute on user devices 106. In FIG. 1, partners (e.g., partner computing systems 108) may provide their applications that include app modules 102 to digital distribution platforms 110 for downloading by user devices 106. The app modules 102 may implement a variety of functions locally on the user device 106. In some implementations, the app modules 102 may also communicate with the remote system 100, which may also provide a variety of functions described herein.

FIG. 1 illustrates an example user device 106 that includes a partner application 104. The partner application 104 includes partner application functionality 112 (e.g., partner application modules), which may represent any of the functionality and/or data associated with the partner application 104. Different partner applications may provide different types of functionality, which may be configured by the application developer. Example types of applications that provide different functionality may include, but are not limited to, e-commerce applications, social media applications, business review applications, banking applications, gaming applications, and weather forecast applications. In a specific example, media applications (e.g., a music streaming application) may provide content (e.g., music and movies) to users. In another specific example, a weather application may provide weather data/reports to users. In another specific example, a business review application may provide reviews for businesses to users.

The partner application 104 includes an app module 102 that may provide a variety of functions for the partner application 104. In some implementations, the app module 102 may store application event data locally. For example, the app module 102 may store application event data that indicates how a user uses the partner application 104. In some implementations, the app module 102 may determine whether to send the stored application event data to the remote system 100 for further actions by the remote system 100.

In some implementations, the app module 102 may perform local attribution operations. For example, the app module 102 may determine whether one or more events (e.g., commerce events) may be attributed to prior events (e.g., selection of an advertisement). In some implementations, the app module 102 may process event data and other locally acquired/processed data (e.g., attribution data) before sending the data to the remote system 100. For example, the app module 102 may aggregate event data and/or attribution data before sending the data to the remote system 100. In some implementations, the app module 102 may receive links from the remote system 100 (referred to herein as "registered links") and provide the links to other applications and/or operating system components (e.g., see FIGS. 11-13). The app module 102 may also determine performance data for the links and provide the data to the remote system 100 for further reporting to the partner.

In some implementations, the remote system 100 may provide updates to the app module 102 for any of the app module functionalities described herein. In some implementations, the remote system 100 may provide partner interfaces (e.g., web-based interfaces) that allow the partner to configure operation of the app modules and monitor performance of their applications (e.g., monitor event data, attribution data, etc.). The remote system 100 may also provide other functionality. For example, the remote system may log application events, log web events, perform attributions for different events, and/or resolve links for the application module 102.

The features provided by the remote system 100, such as event logging and attribution, may be useful to a variety of parties, such as businesses, advertisers, and application developers that may wish to monitor performance of their applications/websites and also may pay fees for the occurrence of certain events (e.g., application installs and/or item purchases). Additionally, the remote system 100 may also be used by other computing systems to provide various functionality to user devices, such as routing a user device into an application state (e.g., an application page) in response to user selection of a web link. As described herein, the app modules 102 may provide a variety of features that may benefit the partners and the users. For example, the local functionality (e.g., local event logging, attribution, etc.) may limit the amount of data communicated between the user devices 106 and the remote system 100, thereby increasing the efficiency and responsiveness of the user devices 106 and the remote system 100. Furthermore, limited data communication between the user device 106 and remote system 100, as well as aggregation of event data at the user device 106, may also provide increased privacy for users.

The environment of FIG. 1 includes a remote system 100 in communication with partner computing systems 108 and a user device 106 via a network 114. The network 114 may include various types of computer networks, such as a local area network (LAN), wide area network (WAN), and/or the Internet.

The environment includes one or more digital distribution platforms 110. The digital distribution platforms 110 may represent computing systems that are configured to distribute applications to user devices 106. Example digital distribution platforms include, but are not limited to, the GOOGLE PLAY® digital distribution platform by Google, Inc. and the APP STORE® digital distribution platform by Apple, Inc. The digital distribution platforms 110 may include partner applications 104, each of which may include an app module 102. The digital distribution platforms 110 may also include a plurality of applications 116 developed by parties other than partners of the remote system 100. Users may download the applications from the digital distribution platforms 110 and install the applications on user devices 106.

The user device 106 includes an operating system (OS) 118 and a plurality of applications, such as a web browser application 120 and additional applications 122. Using the web browser 120, the user device 106 can access various websites on servers (not shown in FIG. 1) via the network 114. The user device 106 may also download applications from the digital distribution platforms 110 via the network 114 and install the applications. The additional applications 122 may include additional partner applications or other applications that were not provided by partners of the remote system 100. Although a single user device 106 is illustrated in FIG. 1, the environment may include a plurality of additional user devices that may each include one or more partner applications and additional applications.

The remote system 100 includes a partner interface system 124 that may provide a partner interface, such as a graphical user interface (GUI) for the partner to use in order to interface with the remote system 100 using a partner computing device. The environment includes a plurality of different partner computing systems 108, each of which may represent partner computing devices and/or partner servers that the partners may use to interface with the remote system 100. For example, partners (e.g., employees of the partner business entity) may use partner computing devices to access the partner interface provided by the remote system 100 in order to implement the features associated with the app module 102 and the remote system 100 described herein, such as acquiring app modules, controlling the functionality of the app modules, and receiving reports from the remote system. An example partner interface for interfacing with the remote system 100 may be referred to herein as a "partner dashboard." The partner dashboard may include a web-based interface or an application interface that includes a variety of GUI elements that assist the partner in configuring operation of the app module 102 and the remote system 100. Example GUI elements may include, but are not limited to, various data visualizations, spreadsheets, tables, graphs, selection elements (e.g., drop down boxes and menus), and text input boxes.

A partner may retrieve the application module components and/or web module components via the partner interface system 124 (e.g., from an app module data store 125). The application module components may include software libraries and functions/methods that may be included in the partner's application. The application module components may be included by the partner in the partner application's codebase. The functions/methods may be invoked to provide applications with various functionalities described herein with respect to the app module and remote system. In some implementations, the partner application functionality may include an initial call to initialize the app module (e.g., upon partner application startup). As described herein, the partners may configure the operation of the app module. The integrated/modified application module components included in the partner's application may be referred to as an "application module" or an "app module." The partner may upload the partner application including the application module to one or more digital distribution platforms.

In some implementations, the remote system 100 may provide web module components to partners that may be integrated into partner websites. In some implementations, partners may operate websites that include similar content as the partner applications. Example similar content may include, but is not limited to, pages including products for sale, services for sale, hotel/room accommodations, music for playing, images/videos, blog posts, and news articles. Web module components may include software libraries and functions/methods that may be included in the partner's website. The functions/methods (e.g., JavaScript) may be invoked to provide the partner website with various functionalities described herein with respect to the remote system 100. For example, the functions/methods may be invoked to request system links, handle the selection of system links, transmit event data to the remote system (e.g., webpage view events), and handle data received from the remote system. The integrated/modified web module components included in the partner's website may be referred to as a "web module."

The partner may also configure how the remote system 100 will behave with respect to the partner application 104 and partner website. For example, the partner may configure the remote system 100 (e.g., using the partner dashboard) by configuring which events can be attributed to other events (e.g., which events are considered attributable events). In some examples, the partner may select the set of attributable events to include an application open event, an application install event, a commerce event (e.g., a purchase event and/or an add to cart event), and/or other custom events defined by the partner. The partner may also configure the attribution time window for the events. The partner configurations may be stored at the remote system 100 (e.g., in a partner configuration data store).

The remote system 100 includes a remote data acquisition module 126 that acquires event data from app modules 102. For example, the remote data acquisition module 126 may acquire individual event data, aggregate event data, attribution data, and/or other data described herein. The remote system 100 includes a remote event data store 128 that may store the individual/aggregate event data and/or other data (e.g., attribution data). The partner interface system 124 may report event data and other performance metrics to the partners. For example, the partner interface system 124 may report individual event data, aggregate event data, attribution data, and/or other data retrieved from the app modules. In some implementations, the partner interface system 124 may further aggregate any of the data described herein across a plurality of user devices. The partners may also retrieve data from the partner interface system 124 indicating how their websites and system links are performing (e.g., how users are using them). Example types of data (e.g., app event data, web event data, and/or system link data) that may be retrieved by partners may include, but is not limited to, attribution data indicating which events are attributed to other events, app installation data, app usage data, and website usage data. Additional types of data may include geographical data (e.g., the location of users using the partner's applications, websites, and/or links).

The remote system 100 includes a remote update module 130 that may provide updates to the app module 102 for any of the app module functionalities described herein. The remote system 100 includes additional remote system modules 132 that may provide for additional features that are illustrated and described herein (e.g., attribution functionality, registered link functionality, etc.).

In some implementations, a single party (e.g., a business) can own/operate the remote system 100. In these implementations, the single party can provide the functionality of the remote system 100 to various partners via the partner interface system 124. Partners may be represented by partner computing systems 108. A single partner may be represented by a partner computing device (e.g., see FIG. 15) that the partner may use to communicate with the partner interface system 124. An example partner may be a business that has a mobile application and/or website. The partner (e.g., business) may integrate with the remote system 100 in order to add the remote system functionality to their applications and websites. The partners may communicate with the partner interface system 124 in order to integrate with the remote system 100 and retrieve data from the remote system 100. For example, the partner may interface with the partner interface system 124 using a dashboard (e.g., a web-based dashboard interface) and/or an application programming interface (API) provided by the partner interface system 124. A plurality of partner devices associated with a plurality of different partners may communicate with the partner interface system 124. Although the remote system 100 may be operated by a single party for use by one or more partners, in some cases, the various functionalities of the remote system 100 may be operated by different parties.

FIG. 1 includes partner app-specific servers 134. A partner app-specific server may represent remote functionality associated with the partner application 104 installed on the user device 106. For example, the partner application 104 may access the partner app-specific server 134 to provide some functionality for the partner application 104. In some cases, the partner app-specific server 134 may provide data to the partner application 104. In some cases, the app-specific server 134 may acquire siloed user data indicating user behavior within the partner application 104. In some cases, the partner app-specific server 134 may provide configuration data for the app module 102 directly and/or via the remote system 100. An example app-specific server and application may include a music application server that provides music and music data (e.g., album names, artists, etc.) to a music application installed on a user device. Another example app-specific server and application may include a weather application server that provides weather data/reports to a weather application installed on a user device.

Figure 2:
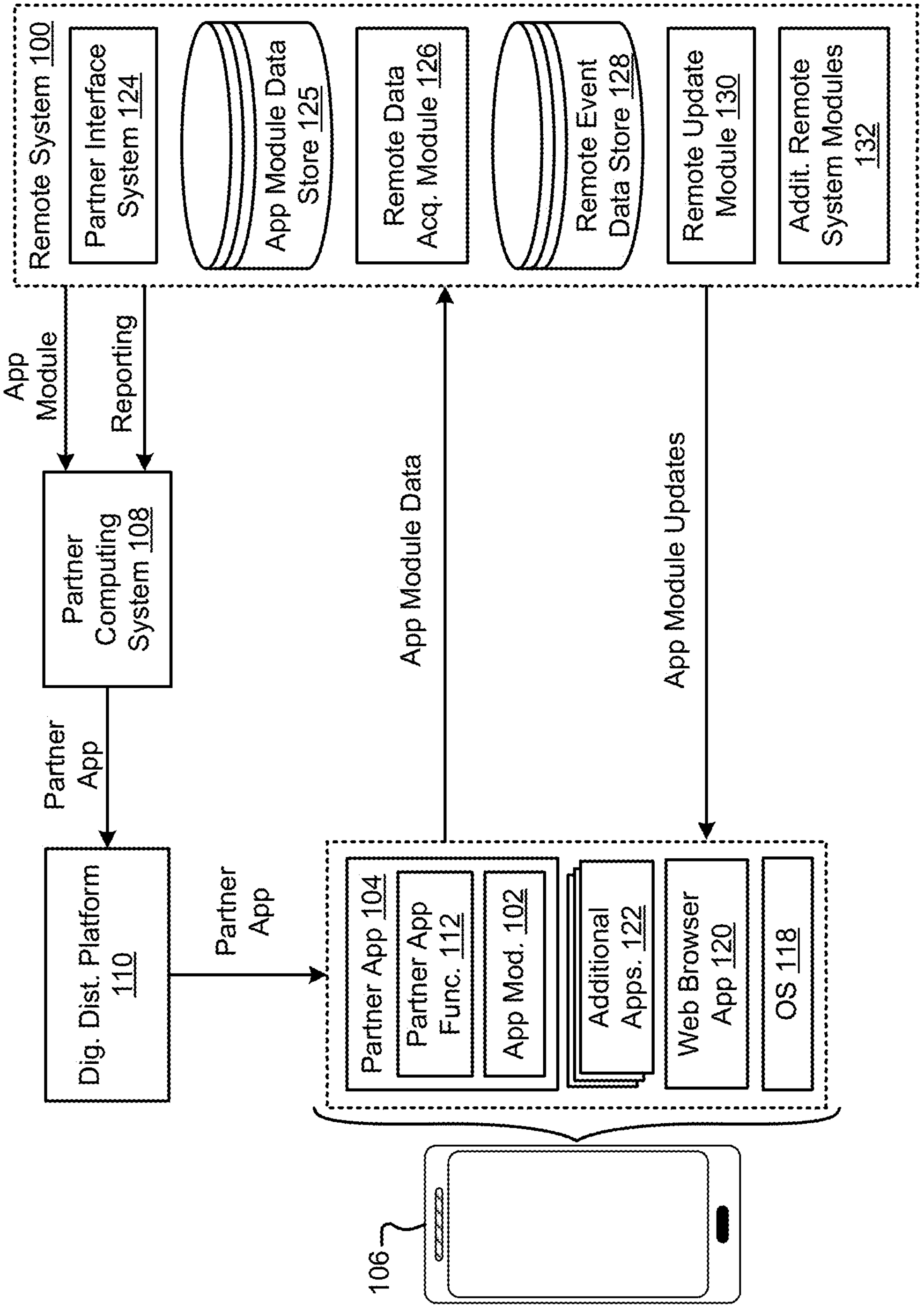
FIG. 2 illustrates example operations of the environment illustrated in FIG. 1.
Figure 3:
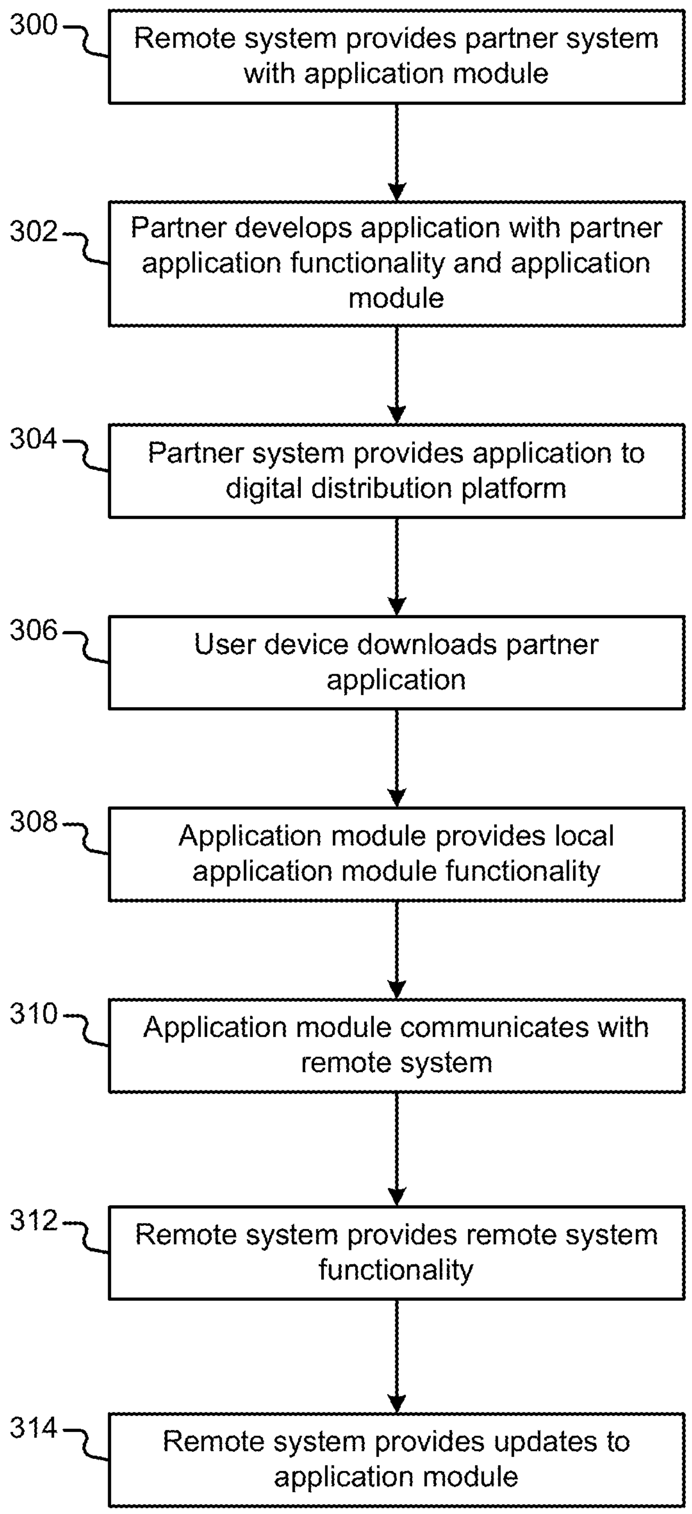
FIG. 3 is a method that describes the example operations illustrated in FIG. 2.

FIG. 2 illustrates example operations of the environment illustrated in FIG. 1. FIG. 3 is a method that describes the example operations illustrated in FIG. 2. In block 300, the remote system 100 provides a partner computing system 108 with an app module 102. In block 302, the partner (e.g., an application developer) develops a partner application including the app module 102. In block 304, the partner computing system 108 provides the partner application 104 to a digital distribution platform 110. In block 306, a user device 106 downloads the partner application 104. In block 308, the app module 102 provides local app module functionality for the partner application 104. In block 310, the app module 102 communicates with the remote system 100 (e.g., reports data to the remote system 100). In block 312, the remote system 100 provides remote system functionality, such as data logging for the user device 106 and an interface for the partner computing system 108 (e.g., reporting/configuration interface). In block 314, the remote system 100 may provide app module updates to the app module 102 on the user device 106.

Figure 4:
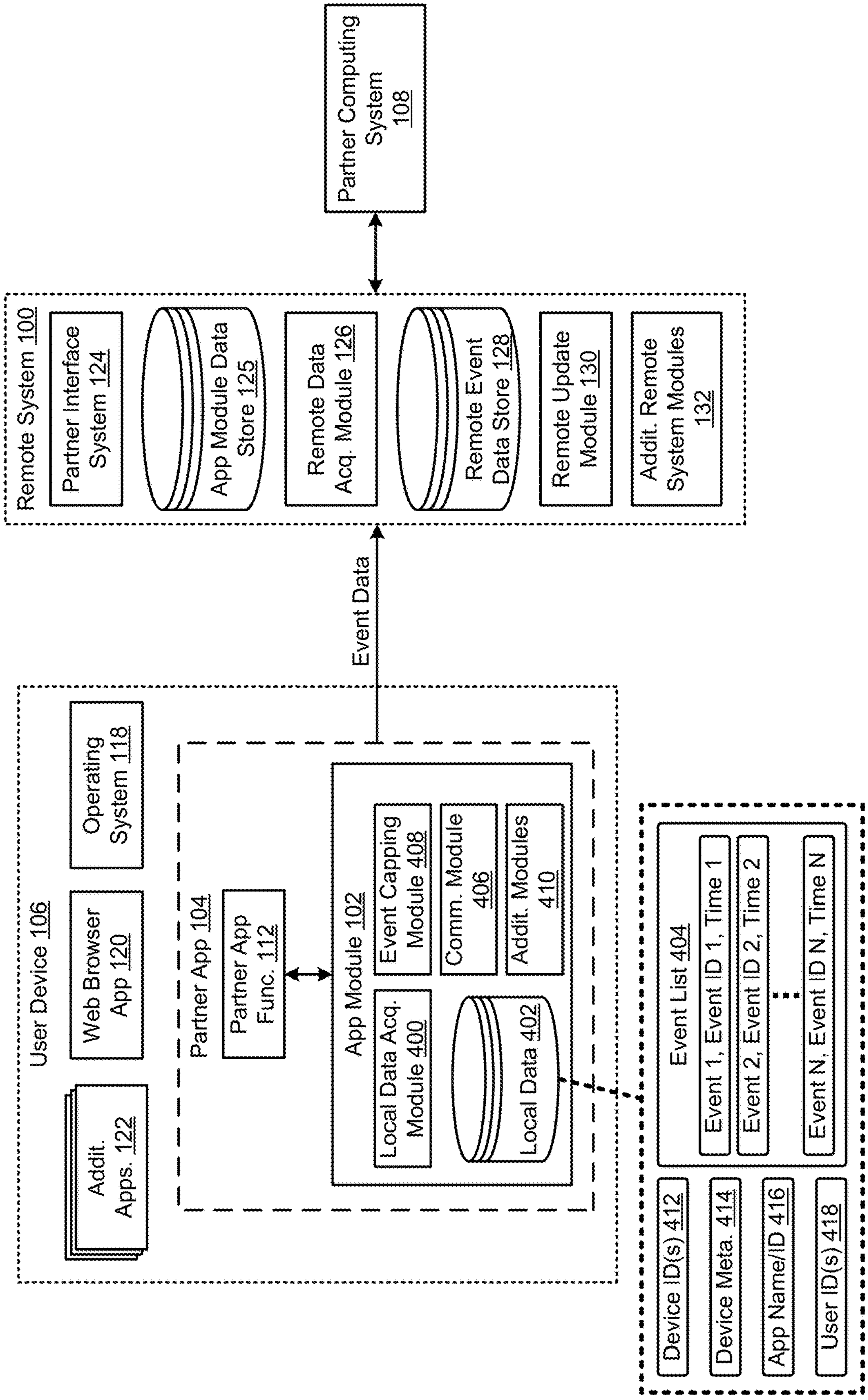
FIG. 4 illustrates an application module that includes a local data acquisition module that acquires event data and stores the event data in a local data store.

FIG. 4 illustrates an app module that includes a local data acquisition module 400 (hereinafter "data acquisition module 400") that acquires event data and stores the event data in a local data store 402 (e.g., in a local event list 404). The app module 102 includes a communication module 406 that may communicate with the remote system 100. For example, the communication module 406 may send data (e.g., event data, attribution data, etc.) to the remote system 100. The app module 102 also includes an event capping module 408 that determines whether to send data to the remote system 100. The app module 102 may also include additional modules 410 that represent additional functionality that may be included in the app module 102, such as attribution functionality, aggregation functionality, registered link functionality, and update functionality.

Users may perform a variety of actions in applications and on websites. A single action may be referred to herein as an "event." For example, a user opening an application may be referred to herein as an "application open event." Events may be associated with corresponding event data. For example, the data generated by a single event may be referred to as an "event data object." The event data object may be acquired by the data acquisition module 400 and stored in the local data store 402 (e.g., event list 404). In some cases herein, the terms "event," "event data," and "event data object" may be used interchangeably. For example, the event list 404 may store a series of events (e.g., a series of event data objects). The stored events that have occurred in the past may be referred to as "historical events" or "historical event data."

Events associated with the partner application 104 may be referred to herein as "app events." The event data associated with app events may be referred to as app event data or app event data objects. As such, the app module 102 may store app event data associated with app events. Events associated with a web browser application (e.g., user actions on websites) may be referred to herein as web events. The event data associated with web events may be referred to as web event data or web event data objects. As described herein, a web module may generate web event data associated with web events.

FIG. 4 illustrates example local data. The example local data includes device ID data 412, device metadata 414, app name/ID data 416, user ID data 418, and an event list 404. The event list 404 includes data for N separate app events. Although the event list 404 is illustrated as separate from the device ID 412, device metadata 414, app name/ID 416, and user ID 418, such data fields may be included on a per-event basis in the local data.

In some implementations, app event data may include device identifiers 412 (hereinafter "device IDs") that identify the user device that generated the app event data. For example, device IDs may include a string of alphabetic, numeric, and/or symbolic characters (e.g., punctuation marks) that can be used to identify (e.g., uniquely identify) a user device among other user devices. In some implementations, the remote system 100 may use the various device IDs for tracking events (e.g., application installations, application opens, and system link selections) and attributing events to prior events.

Some device IDs may be associated with applications installed on the user device 106 (e.g., applications other than the web browser 120). In some cases, the device IDs may be operating system generated IDs that installed applications may access. Additional example device IDs may include advertising IDs, which may vary depending on the operating system on the user device. Another example device ID may be a hardware device ID (e.g., a unique device serial number). Device IDs associated with the web browser may be referred to herein as "web IDs." Example web IDs may include browser cookie IDs, which may be referred to as web cookies, internet cookies, or Hypertext Transfer Protocol (HTTP) cookies. Although example device IDs described herein may include web device IDs, advertising IDs, and hardware IDs, the techniques of the present disclosure may be applicable to other types of IDs that can be used to uniquely identify a user device.

In some implementations, event data may include user identification data 418 that identifies a user. User identification data may include a username/login. In some cases, the username may include an email address. The user identification data may identify a user with respect to a website/application. In one specific example, the username and application name/ID pair may identify a user uniquely with respect to the application/website associated with the app name/ID.

The user device 106 (e.g., app module 102) may store app event data in response to a variety of different user actions. For example, the app module 102 may store app event data in response to: 1) an application being opened (referred to as an "app open event"), 2) the user closing the application (referred to as an "app close event"), 3) the user adding an item to a shopping cart or the user purchasing an item (referred to generally as "application commerce events"), 4) the user opening the application after installation (referred to as an "app installation event"), 5) the user opening the application after reinstallation (referred to as an "app reinstallation event"), 6) the user requesting that a system link be created by the remote system and sent back to the user device (e.g., in order to share content), 7) a user accessing/viewing a page of the application (e.g., a page view event), 8) a user signing up or registering in the application (e.g., a lifecycle event), and/or 9) the user performing any other action that the app module has been configured by the partner to store (i.e., a custom event defined by the partner, such as viewing of a specific page or sharing specific content).

The app module 102 may be configured to generate a variety of different app events. As such, the above list of app events is only an example list of possible app events. In some implementations, the app module 102 may be configured to generate the above app events or different app events. Different partners may configure their app modules to acquire different event data.

The app event data stored by the user device may include, but is not limited to: 1) a device ID 412 (e.g., an advertising ID, hardware ID, etc.), 2) an application name/ID 416 (referred to herein as "app name/ID" or "app ID") that indicates the application with which the app event data is associated, 3) user identification data 418 that identifies a user of the app (e.g., a username), 4) source data indicating the source of the event data, 5) device metadata 414 (e.g., user agent data), such as an IP address, OS identification data (e.g., OS name, OS version), device type, and screen resolution, and 6) event time (e.g., a timestamp indicating when the event occurred). The source data may indicate a network location and/or circumstances associated with the generation of the event data, such as whether the data was generated from a banner view/selection, a sharing event, an interstitial view/selection, a general page view, a marketing link, within an email, within a short message service (SMS) message, in a general advertisement, and/or in a social media location. In some implementations, the source data can identify an advertising campaign name (e.g., generated by a partner) associated with the event. In some cases, the source data can indicate whether the event data came from the app/web module, from a system link, and/or from external event data. In some cases, the source data can include the app name/ID. The source data may also include referral data (e.g., HTTP referrer data) that indicates how the user accessed the webpage or application page in which the event took place. The source data may assist in determining which events are attributed to prior events.

The app event data may also include an event identifier that indicates the type of event. For example, the event identifier may indicate whether the app event is an app open event, an app close event, an app installation event, an app reinstallation event, a page view event, a lifecycle event, a commerce event (e.g., an add to cart event or a purchase event), or a custom event that may be defined by the developer in the app module. In the case the app event is an app open event that resulted from user-selection of a link (e.g., a system link), additional app event data may be transmitted by the user device, such as the URI (e.g., a system URI) that caused the user device to open the application. In some cases, the app event data may also include a web ID (e.g., appended to the system URI) associated with the URI, such as when selection of a web link opens the partner application. Note that the event list 404 includes N events, each of which have an associated event ID and event time. Each of the events in the event list may also be associated with other data described herein (e.g., device IDs, metadata, etc.).

In some implementations, the event list may include additional data described herein for each of the events. For example, an application event may include data indicating one or more of the following: 1) whether the event was capped or sent to the remote system 100, 2) whether the event is a test event, 3) attribution data associated with the event, and 4) what logic/data and versions were used for decisions associated with the event (e.g., capping logic, attribution logic, as well as version numbers).

In some implementations, the app module 102 may send app event data to the remote system 100. The remote system 100 may include a remote data acquisition module 126 that acquires event data from user devices 106 and other sources (e.g., web modules and external data systems 1500). The remote system 100 may store event data for a plurality of user devices in the remote event data store 128. The data stored at the remote event data store 128 may be similar to that stored locally on the user device 106. Additionally, the remote event data store 128 may receive data for user devices from additional sources, such as web modules and external data systems 1500. The partner computing systems 108 may retrieve the data from the remote system 100 (e.g., via the partner dashboard). In addition to receiving and logging data from app modules and other sources, the remote system 100 may provide additional functionality. For example, the remote system 100 may provide updates to app modules, provide remote attribution functionality, and provide responses to received event data.

Figure 5:
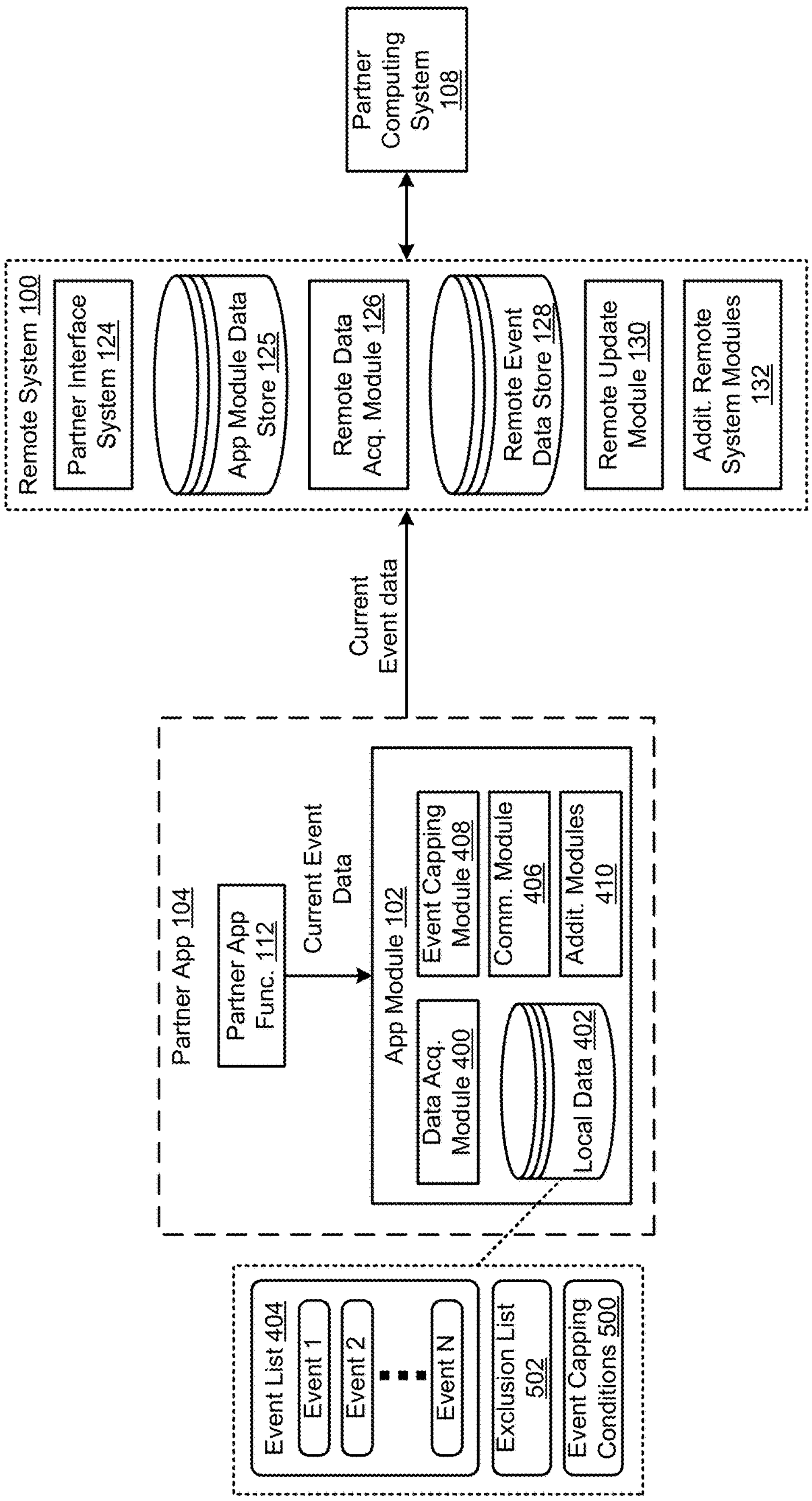
FIG. 5 illustrates an example application module that includes an event capping module.

FIG. 5 illustrates an example app module 102 that includes an event capping module 408. The event capping module 408 may determine whether to send event data to the remote system 100. Event capping may refer to limiting which event data is sent to the remote system 100. For example, the app module 102 may refrain from sending some event data to the remote system 100 if event capping conditions 500 are satisfied for the event data. Put another way, in some examples, the event capping conditions 500 may indicate conditions upon which an application event should not be reported to the remote system 100. As another example, the app module 102 may send event data to the remote system 100 if event capping conditions 500 are not satisfied for the event data. Reducing a number of events sent to the remote system 100 may enhance efficiency at the user device 106 and remote system 100 by reducing a total number of communications between the user device 106 and the remote system 100. Furthermore, limiting the number of events sent from a user device 106 may further enhance privacy for the user of the user device 106. The remote system 100 operators and/or partners may configure any of the parameters associated with capping events.

In some cases, event data that was not sent to the remote system 100 at the time of the event may be sent at a later time. In these cases, capping an event may result in the delayed reporting of the event (e.g., in another manner, such as in aggregated data). In some implementations, the app module 102 may aggregate the event data for reporting at a later time. In some implementations, event data that was not sent to the remote system 100 at the time the event occurred may never be sent to the remote system 100.

The event capping module 408 may determine whether to send event data (e.g., recent event data) to the remote system 100 based on one or more event capping conditions 500 described herein. For example, the event capping module 408 may determine whether to send current event data (e.g., a most recent event) to the remote system 100 based on data associated with the current event, data included in past events (e.g., in the local event list 404), partner configurations, and/or remote system configurations. A variety of example event capping logic and parameters may be used to determine whether to send event data to the remote system 100. Any of the event capping logic and parameters may be updated by the remote system operators and/or the partners. For example, the app module 102 may include initial event capping conditions (e.g., initially installed event capping conditions or a most recently received set of event capping conditions) that may then be subsequently updated one or more times by updated event capping conditions received from the remote system 100.

In some implementations, the event capping module 408 may determine whether to send event data to the remote system 100 (or other system) based on whether the event data can be handled locally on the user device 106 (e.g., by the partner application 104 or other installed application). For example, in some implementations, the event capping module 408 may refrain from sending events to the remote system 100 that may be handled properly on the user device 106 without additional remote system processing or other intervention. In a specific example, if the partner application is opened to an application page that can be opened without additional data and/or uniform resource identifier (URI) or uniform resource locator (URL) resolution from the remote system 100, the event capping module 408 may refrain from sending the event data to the remote system 100 for remote logging at the remote system 100.

In some implementations, the event capping module 408 may be configured to send events to the remote system 100 that may require resolution by the remote system 100 (e.g., when the user device is unable to resolve specific data/fields locally). For example, the remote system 100 may resolve URLs/URIs provided by the partner application so that the partner application may be directed to a final application page. In a specific example described herein, system links (e.g., links provided by the remote system) may be generated by the remote system for distribution via applications and websites. The system links may direct a user's browser or application to URIs/URLs that are stored and/or generated at the remote system. In another specific example, the remote system may provide other data to the partner application that may be used by the partner application to access partner application pages and/or provide other partner application features, such as discount codes for products available on the partner application.

In some implementations, the event capping module 408 may determine whether to send event data to the remote system 100 based on the event type of the current event. For example, in some implementations, the event capping module 408 may be configured to refrain from sending event data to the remote system 100 for specific types of events. As another example, the event capping module 408 may be configured to send event data for specific types of events to the remote system 100. Example event types that the event capping module may refrain from sending, or be configured to send, may include, but are not limited to, app open events, install events, reinstallation events, commerce events, page view events, custom events (e.g., partner-defined events), life cycle events (e.g., sign up, registration, etc.), and other event types described herein. The remote system operators and/or partners may configure which types of events are sent to the remote system.

In some implementations, the event capping module 408 may determine whether to send event data to the remote system 100 based on the event type of the current event and past event data in the local event list 404. For example, in some implementations, the event capping module 408 may be configured to refrain from sending events to the remote system 100 based on a number of similar events (e.g., similar event types) included in the local event list 404. For example, the event capping module 408 may refrain from sending a current event when the local event list 404 includes one or more events having the same event type as the current event. This may be implemented in cases where the remote system 100 may not benefit from the knowledge that the user has already completed an event (e.g., completed an event a threshold number of times). In a specific example, if the remote system tracks a first user page sharing event, the event capping module 408 may refrain from sending subsequent page sharing events to the remote system 100. The remote system operator and/or partners may configure the current event type and the past event data that may cause event capping.

In some implementations, the event capping module 408 may determine whether to send event data to the remote system 100 based on additional data and/or data fields associated with the current event, such as URI/URL parameters (e.g., deep link parameters) associated with the event. Example URI/URL parameters used to determine whether to send event data to the remote system may include domain name, path, and/or the presence of other parameters and/or values in the URI/URL. In some implementations, the presence of a specified domain, path, parameter, and/or value in the URI/URL may indicate that a response is needed from the remote system 100. If a response is needed from the remote system 100, the event capping module 408 may send the event data to the remote system 100. If the domain, path, parameter, and/or value in the URI/URL indicates that a response is not needed from the remote system 100, the event capping module 408 may refrain from sending the event data to the remote system 100. The remote system operator and/or partners may configure the additional data and/or data fields that may cause event capping.

In some implementations, the event capping module 408 may operate according to an exclusion list 502 that excludes some events from capping (e.g., requires that some events be sent to the remote system 100). For example, the exclusion list may indicate that specific data and/or data fields in the event data require that the event data be sent to the remote system 100. Example deep link parameters in an exclusion list may include, but are not limited to: 1) system links, 2) Apple Universal Link URLs, 3) local URLs, 4) Apple Spotlight identifiers, 5) external intent URIs, 6) Android App Link URLs, 7) push identifiers, and 8) Google search install referrers. The exclusion list 500 may vary for different platforms (e.g., different operating systems, user device types, etc.). The remote system operator and/or partners may configure the exclusion list 500.

In some implementations, the event capping module 408 may determine whether to send event data to the remote system 100 based on whether the event is a partner-specified test event or other specified test event (e.g., specified by the remote system operator). Test events may include events that a partner or other party would like reported for later observation (e.g., as part of a software test). The partners and/or the remote system operator may configure which test events may or may not be required to be sent to the remote system 100. In some implementations, the app module 102 may be set into a verification/testing mode in which event capping may be disabled for testing purposes. In the verification/testing mode, the event data may be appended with a decision of whether or not the event would be capped under normal operation (e.g., when the verification/testing mode is disabled).

In some implementations, the event capping module 408 may take into account events that have occurred within a specified time window when refraining from sending events (e.g., a time window of hours or days). For example, the event capping module 408 may perform event capping analysis based on event data within the event list 404 over a specified amount of time and/or specified number of events. The remote system operator and/or partners may configure the time windows and/or the number of events taken into account for event capping.

The app module 102 (e.g., data acquisition module 400) may log a current event in the local event list 404 before/after determining whether to send the event to the remote system 100. The local event list 404 may include any of the event data described herein. In some implementations, the local event data may include additional data, such as data associated with any additional determinations made for the event data. For example, a decision of whether to send the event to the remote system or not may be stored in the local event data. As another example, any attributions associated with the event may be stored in the local event data. As another example, the logic/parameters used for the decision (e.g., capping logic, attribution logic, etc.) may be stored. As another example, whether a testing/verification mode was enabled may be stored. Other metadata may also be stored with an event, such as the data used in the calculations, timestamps, versions of logic (e.g., version of event capping logic, version of attribution logic, etc.), etc.

If the event capping module 408 decides to refrain from sending the current event to the remote system 100, the event may be logged in the local event list 404 and/or handled locally by the partner application 104. If the event capping module 408 decides to send the current event to the remote system 100, the user device 106 may send the current event data to the remote system 100, which may respond to the current event in any manner described herein.

Figure 6:
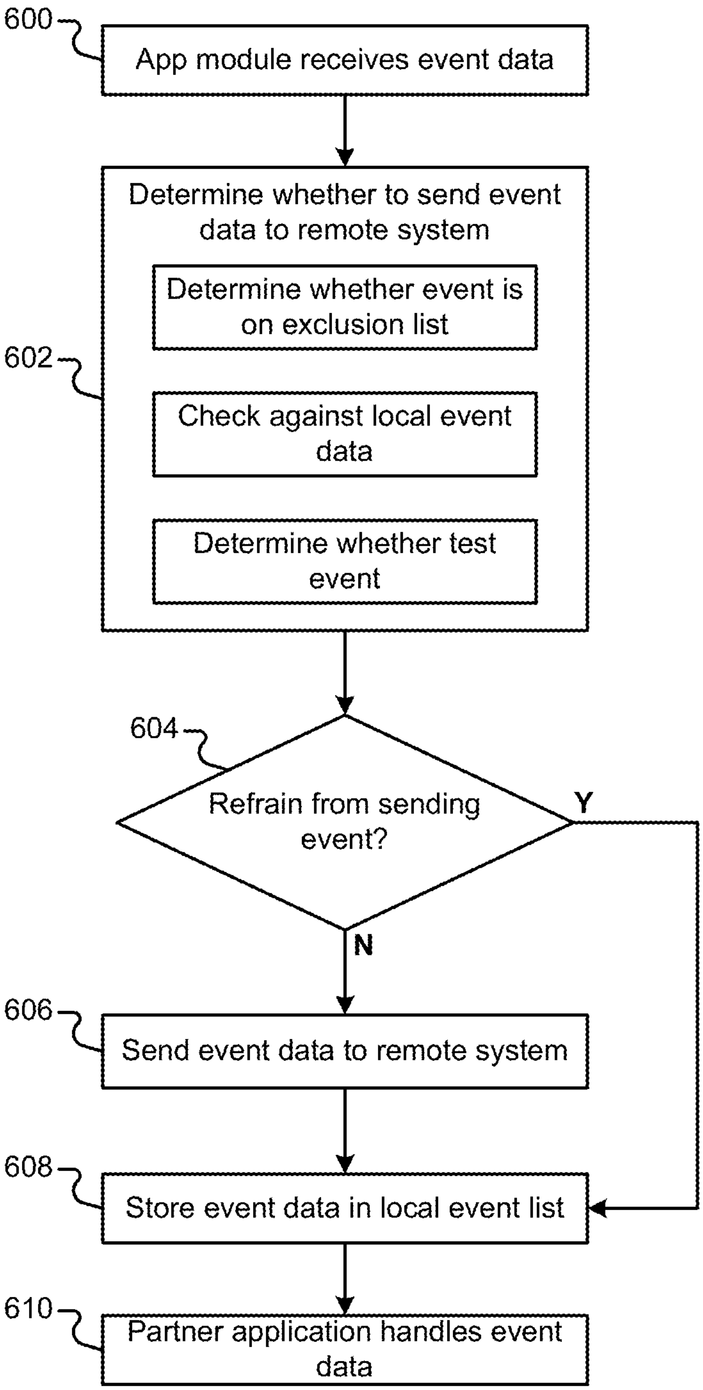
FIG. 6 illustrates an example method for capping events.

FIG. 6 illustrates an example method for capping events. In block 600, the app module 102 receives event data. In block 602, the event capping module 408 determines whether to send event data to the remote system 100. For example, the event capping module 408 may determine whether to send data to the remote system 100 based on: 1) whether the event is on the exclusion list 502, 2) the number/timing of other events in the local event data, 3) whether the event is a test event, and/or other factors described herein.

If the event is not capped in block 604, the user device 106 may send the event data to the remote system 100 in block 606. In block 608, the app module 102 may store the event data in the local event list 404. If the event was capped in block 604, the app module 102 may store the event data in the local event list 404 without sending the event data to the remote system 100. In block 610, the partner application 104 handles the event data (e.g., based on local event data and/or a remote system response).

Figure 7:
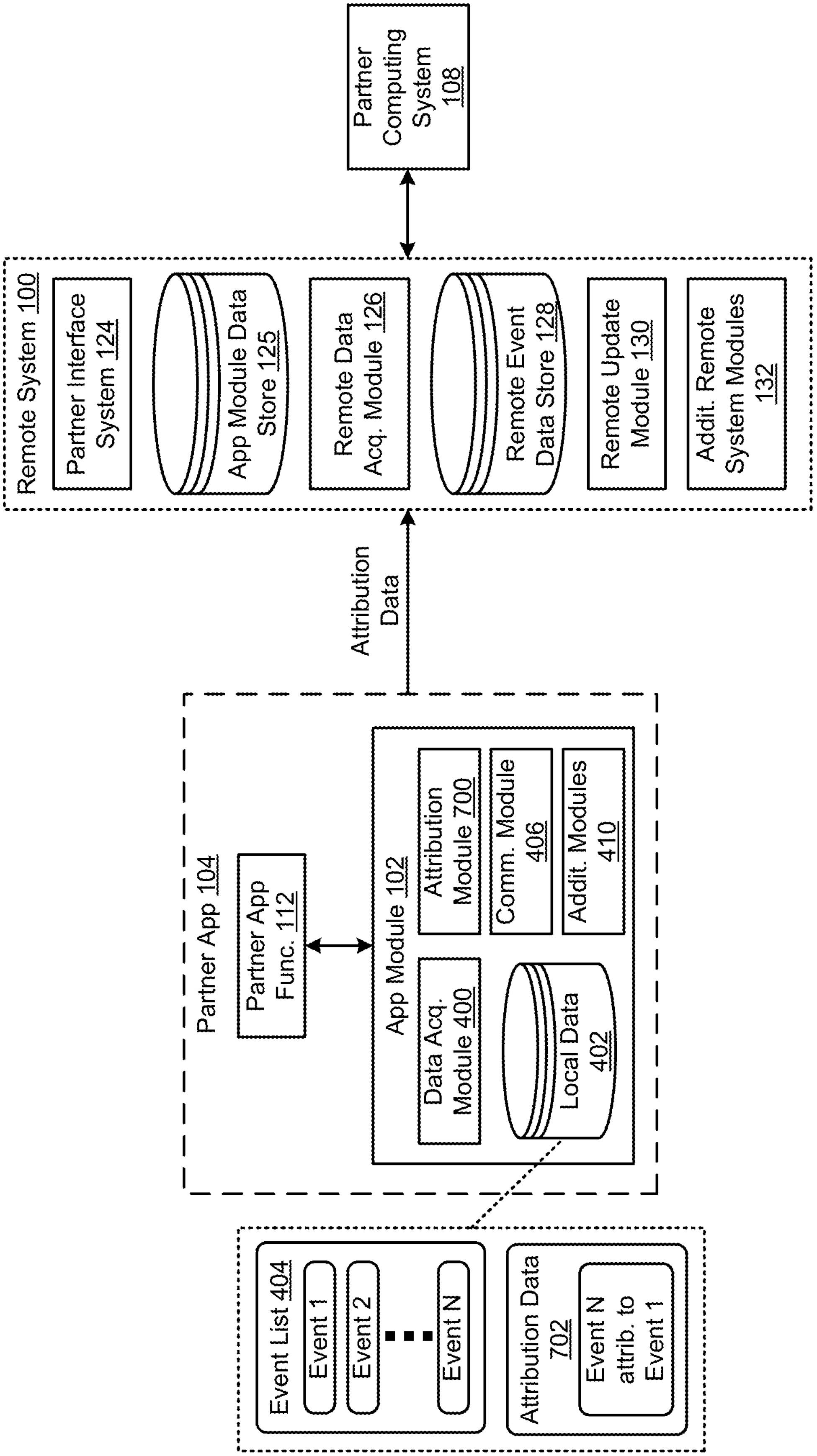
FIG. 7 illustrates an application module that includes an attribution module that provides attribution functionality.

FIG. 7 illustrates an app module 102 that includes an attribution module 700 that provides attribution functionality. The attribution module 700 may attribute one or more events in the event list 404 to one or more prior events in the event list 404. The attribution module 700 may store the attribution data 702 in the local data 402. Attribution data may indicate which of the one or more events is attributed to one or more prior events. In FIG. 7, the attribution data 702 indicates that Event N has been attributed to Event 1.

Figure 8:
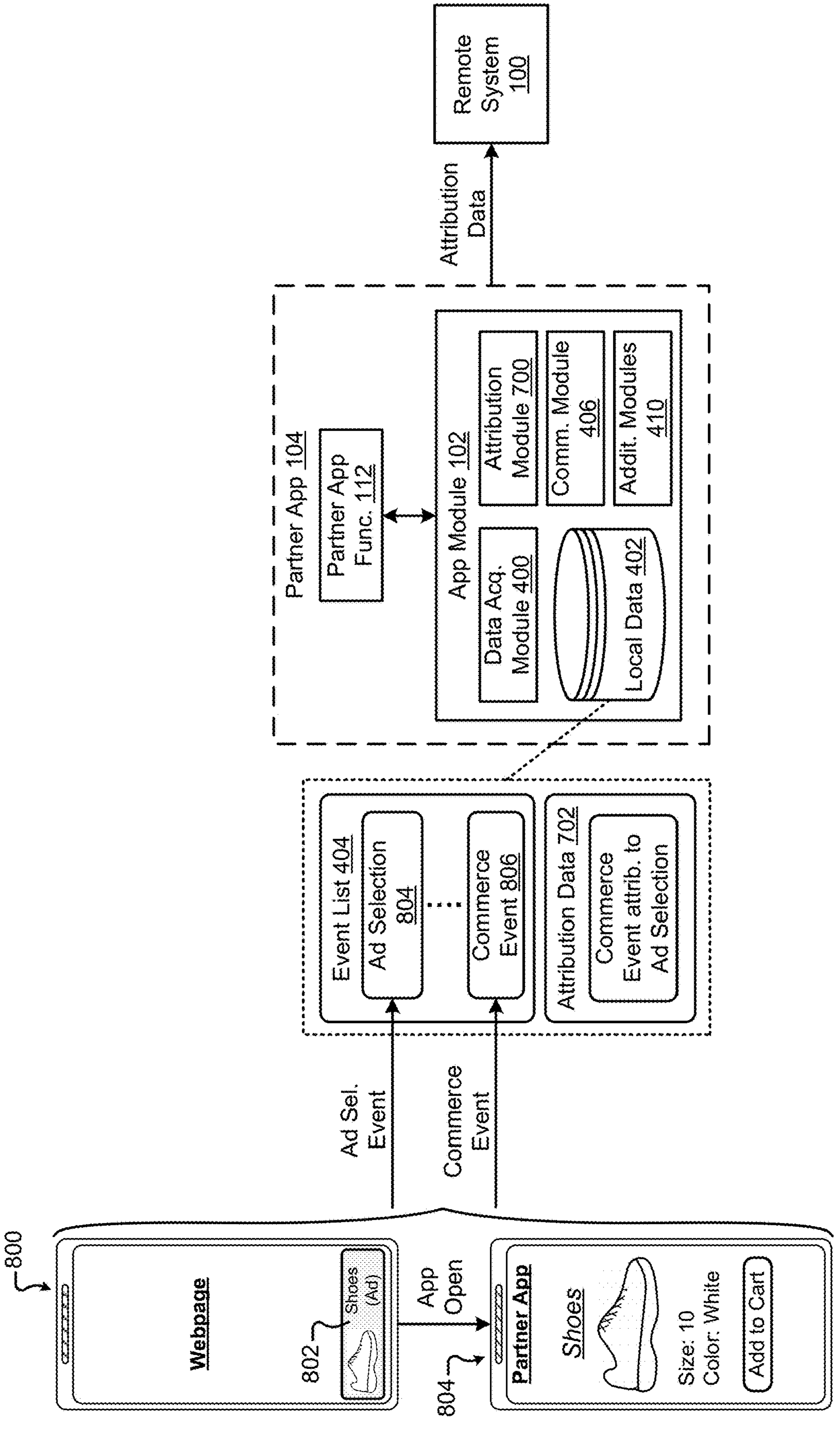
FIG. 8 illustrates an example scenario in which an application commerce event is attributed to a prior advertisement selection event on a webpage.

FIG. 8 illustrates an example in which an application commerce event is attributed to a prior ad selection event on a webpage. In FIG. 8, a user is viewing a webpage that includes an advertisement for a pair of shoes (e.g., at 800). The user selects the advertisement link for the shoes 802, which opens the partner application 104 (e.g., a shopping application). The advertisement selection data 804 is passed into the partner application 104 and stored in the event list 404 by the application module 102. For example, the app module 102 may store any data passed into the partner application 104, such as an advertisement ID, or other data included in the advertisement path/parameters, that identifies the shoe advertisement link. In FIG. 8, the user then performs a commerce event inside the partner application (e.g., at 804), such as adding the pair of shoes to an online shopping cart and/or purchasing the shoes. The app module 102 stores the commerce event 806 in the event list 404. The application module 102 further generates attribution data 702 that attributes the commerce event to the ad selection event. The app module 102 may report the ad selection event, commerce event, and/or attribution data to the remote system 100 for later reporting to the partner.

The attribution of events in FIG. 8 is only one example of attribution. In general, any type of event may be attributed to any other one or more types of events. For example, any type of app event may be attributed to any other type of web event that has been passed into the partner application. In a specific example, a specific page view event in the partner application may be attributed to a web click event that opened the partner application. As another example, any type of app event may be attributed to any one or more app events. For example, a commerce event or a sign-up event in the partner application may be attributed to one or more prior page view events in the partner application.

Figure 9:
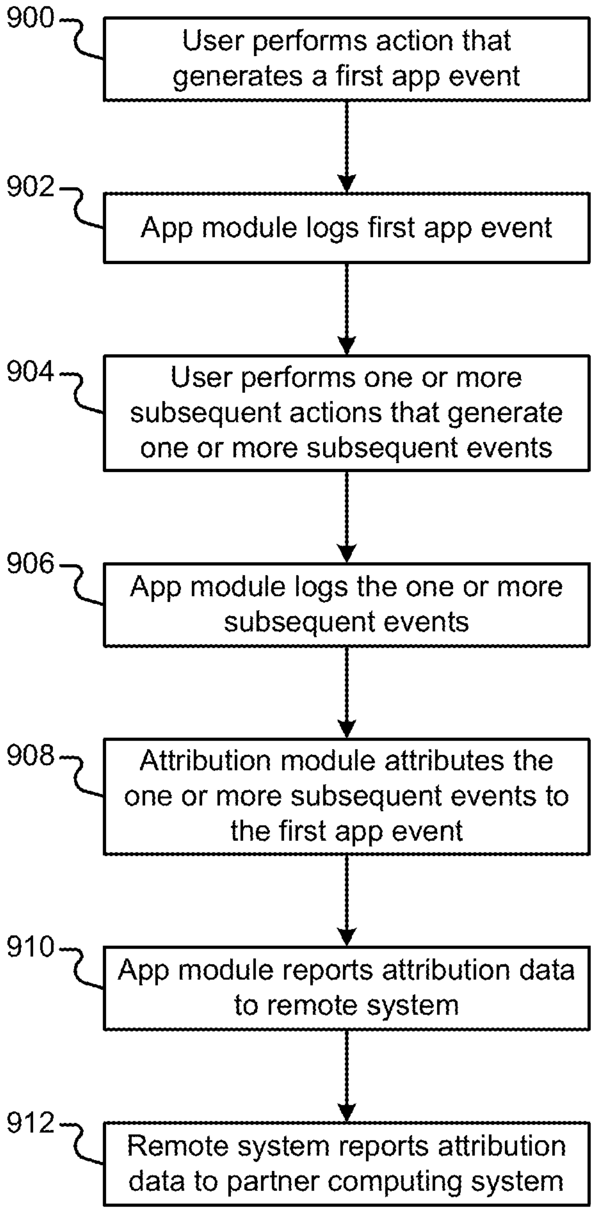
FIG. 9 illustrates an example method that describes application module attribution functionality.

FIG. 9 illustrates an example method that describes operation of the app module attribution functionality. In block 900, the user performs an action that generates a first app event. For example, the user may select a link that opens the partner application and/or perform an action within the partner application. In block 902, the app module 102 logs the first app event in the event list 404. In block 904, the user performs one or more subsequent actions that generate one or more subsequent app events. In block 906, the app module 102 logs the one or more subsequent app events. In block 908, the attribution module 700 attributes the one or more subsequent app events to the first app event. In block 910, the app module 102 reports attribution data to the remote system 100 indicating the attribution determined in block 908. In block 912, the remote system 100 reports the attribution data to the partner computing system 108.

Figure 10:
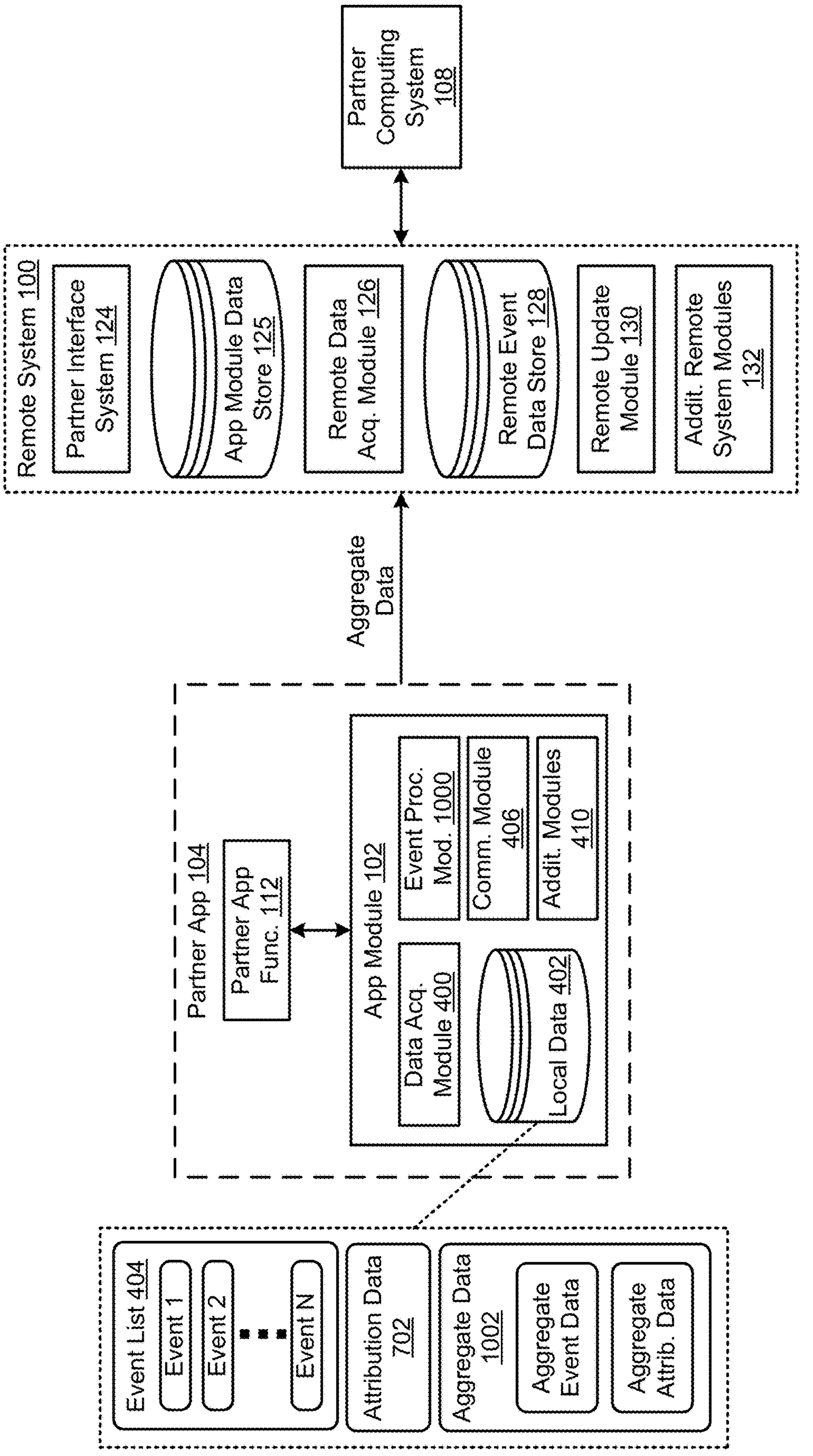
FIG. 10 illustrates an application module that includes an event processing module that processes local event data.

FIG. 10 illustrates an app module 102 that includes an event processing module 1000. The event processing module 1000 may process the local data for transmission to the remote system 100. For example, the event processing module 1000 may process the event data in the event list 404 and the attribution data 702 before the data is sent to the remote system 100. In one example, the event processing module 1000 may aggregate the event data and/or the attribution data before sending the aggregate data to the remote system 100, as illustrated in FIG. 10 at 1002. For example, the app module 102 may report total numbers of events (e.g., by event type) and/or total number of attributable events to the remote system 100. Aggregating the event data and/or attribution data, or processing the data in another manner, may enhance user privacy. The remote system operator and/or the partners may configure the processing parameters (e.g., aggregation parameters) described herein.

In some implementations, the event processing module 1000 may be configured to aggregate events within a specified time window (e.g., configurable by the remote system operator and/or partner). In some implementations, the event processing module 1000 may be configured to aggregate batches of events based on a number of total events. For example, the event processing module 1000 may aggregate events for every X number of events or once X events of a specific type are logged. In some implementations, the event processing module 1000 may be configured to aggregate by event type. For example, the event processing module 1000 may provide a single number per event type that indicates a total number of events of that type. The event processing module 1000 may also be configured to aggregate specific types of events, such as total page views for a specific page, total selections/clicks within the partner app, total number of outside clicks that opened the partner application, total number of commerce events (e.g., purchase events), etc. In some implementations, the event processing module 1000 may be configured to aggregate the number of events attributed to other events. For example, the event processing module 1000 may be configured to aggregate the number of events in an application that are attributable to a single web link selection that opened the partner application. As described herein, the remote system operator and/or the partners may configure the aggregation of events and attribution data so that the partners can receive adequate insightful information regarding application usage while also maintaining user privacy.

Figure 11:
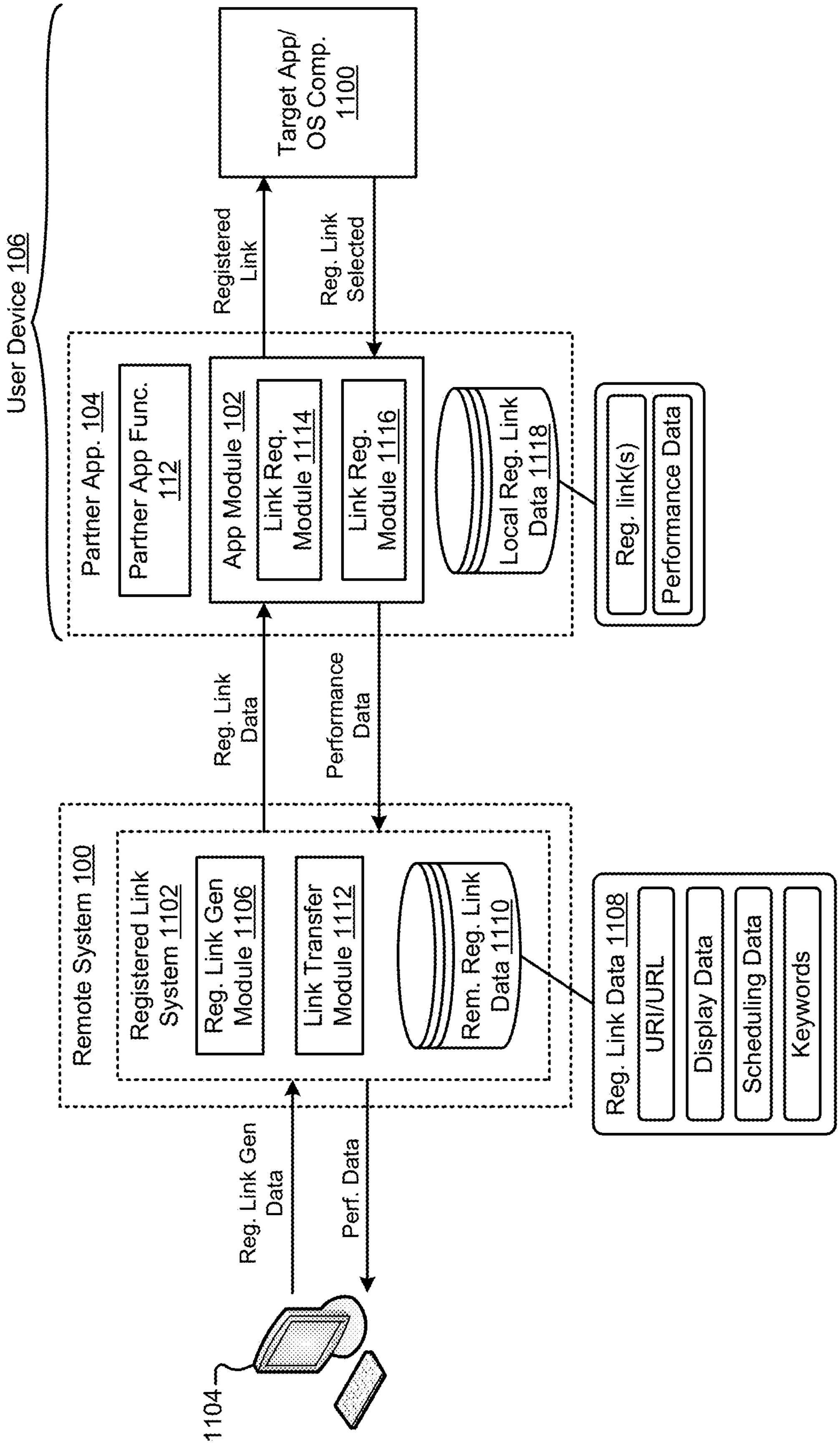
FIGS. 11-13 illustrate features of a remote system that sends partner-generated links to an application module for registration with another application and/or operating system component.
Figure 12:
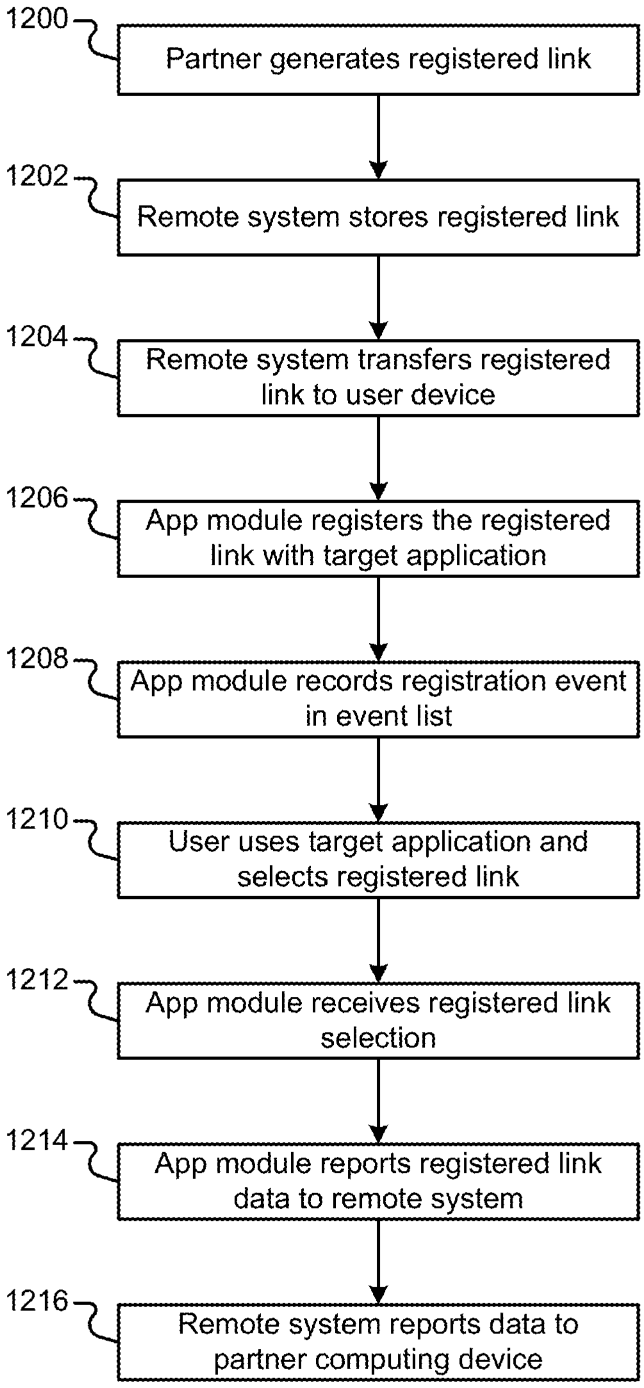
Figure 13:
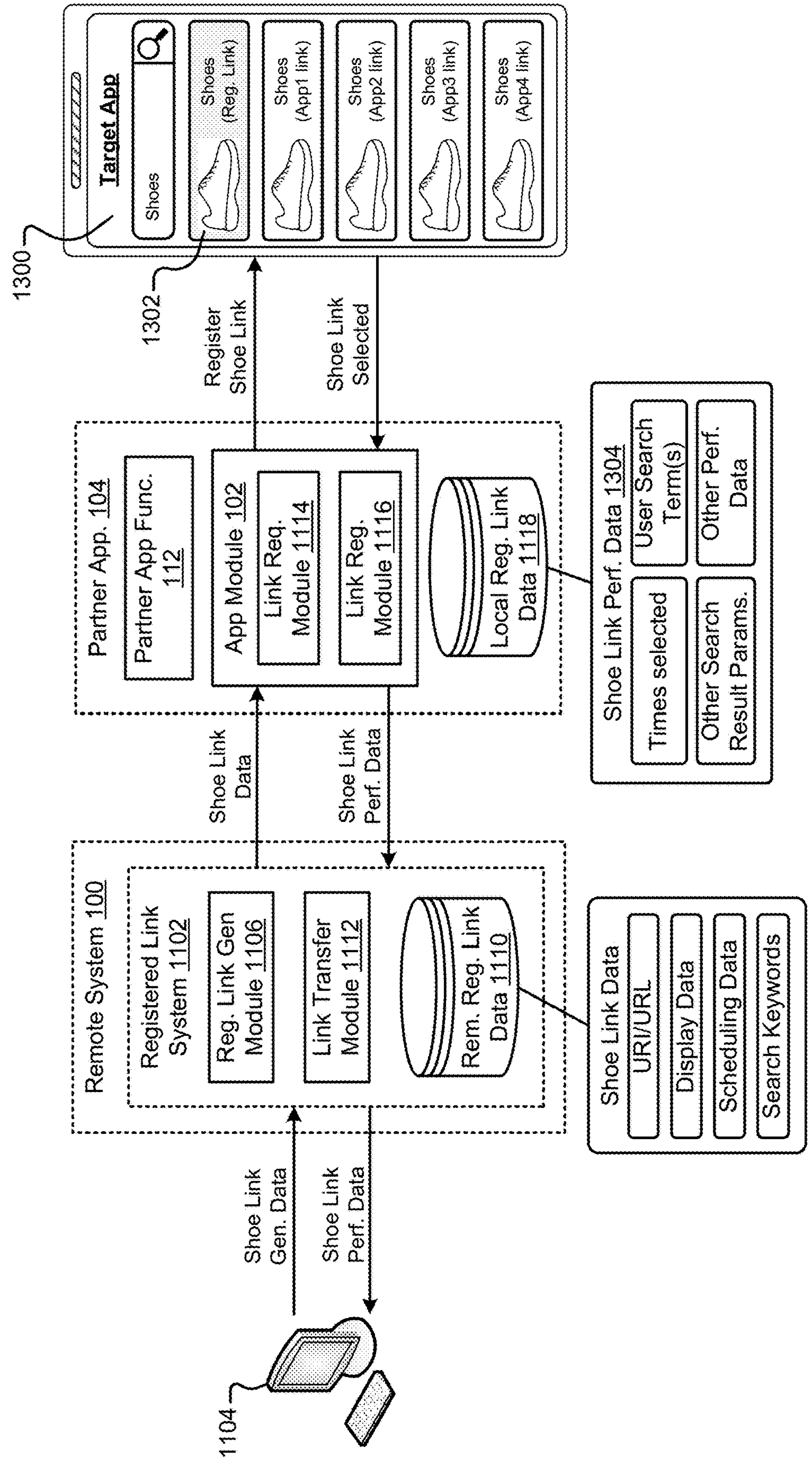

FIGS. 11-13 illustrate features of the remote system 100 that may send partner-generated links to the app module 102. The app module 102 may send the partner-generated links to one or more other applications and/or OS components (e.g., an OS search component) for later display/selection by the user in the other applications and/or OS components. Sending the links from the app module 102 to the other applications and/or OS components may be referred to as "registering the links." As such, the app module 102 may register the links with other applications and/or OS components. In the examples of FIGS. 11-13, the other applications and/or OS components may include functionality for registering the links, such as a provided application programming interface (API). The partner-generated links may be referred to as "registered links." The other applications and/or OS components that receive the registered links from the app module 102 may be referred to as "target applications 1100" or "target OS components 1100." Although the registered links may be registered with target applications 1100 or target OS components 1100, the registered links are described hereinafter as being registered with target applications 1100.

The remote system 100 includes a registered link system 1102 that may implement the features of registered links at the remote system 100. The app module 102 includes local registered link modules that may implement the features of registered links at the user device 106. FIG. 11 and FIG. 13 illustrate features of the remote system 100 and the app module 102 that are limited to the registered link functionality in order to simplify the figures. For example, FIG. 11 and FIG. 13 illustrate a limited number of modules directed to the registered link functionality. As such, it should be understood that the remote system 100 and the app module 102 may include any of the additional functionality described herein (e.g., any of the modules and/or data stores illustrated in the other figures).

Partners may interface with the registered link system 1102 to generate the registered links. For example, the registered link system 1102 may provide a partner interface (e.g., a dashboard interface) for generating any of the registered link data described herein. In FIG. 11, a partner uses a partner computing device 1104 to specify registered link generation data to the registered link system 1102. The registered link generation module 1106 may store the registered link data 1108 in the remote registered link data store 1110. The registered links may be links that will open the partner application 104 when selected by a user (e.g., in the target application user interface). The registered links may also include tracking data that the app module 102 may store for later reporting to the remote system 100 and/or for use in attribution. Using the registered link interface, a non-technical user may easily create and update registered links that can be downloaded into the application module 102 for registration with the target application 1100.

A link transfer module 1112 transfers the registered link to the app module 102. The app module 102 may then register the registered link with the target application 1100. At a later time, the user may view and/or select the registered link in the target application 1100. In one example, if the target application 1100 is a search application, the registered link may be stored in a search index and displayed as a search result (e.g., according to search metadata associated with the registered link). The partner application 104 may open and access content specified in the registered link in response to user-selection (e.g., touching/clicking) of the registered link. The app module 102 may determine that a registered link has been selected based on data in the registered link that was passed into the partner application 104 (e.g., data in the registered link URL and/or acquired from the remote system 100). The app module 102 may store the event data associated with selection of the registered link and later report the event data and/or attribution data to the remote system 100.

In a specific example, a partner that develops a music application may generate a registered link for promoting a music album in a target search application. In this example, the partner may generate the registered link URL and link display data (e.g., text/image data) for rendering a registered link in the target search application as a search result. The partner may also specify additional registered link data for handling the registered link, such as search query words that may yield the registered link as a search result. The partner may also specify other data described herein, such as scheduling data that indicates a time window (e.g., a start date and/or expiration date) during which the registered link should be shown in search results. The user may select the registered link in the target application search results to launch the partner application according to the registered link URL. The app module may report selection of the registered link to the remote system, which may in turn report the selection to the partner.

FIG. 12 is a method that describes example operations of the remote system 100 and a user device 106 with respect to registered link generation, registered link transfer, and user-selection of registered links. In block 1200, the partner generates a registered link using the partner dashboard. The remote system 100 may include a registered link system 1102 (e.g., a registered link generation module 1106) that generates the registered link. The generated registered links may be stored in a remote registered link data store 1110.

The registered links may include a variety of types of data. In some implementations, a registered link may include a URI/URL that may be used to access content in the partner application 104. In some implementations, a registered link may include display data (e.g., text/images) used to render the registered link in the target application 1100. In some implementations, a registered link may include scheduling data and/or instructions that may be implemented by the remote system 100, app module 102, and/or target application 1100, depending on the implementation. The scheduling data/instructions (hereinafter "scheduling data") may indicate conditions for transferring and displaying the registered links, such as: 1) transferring the registered links from the registered link system 1102 to the app module 102, 2) transferring the registered links from the app module 102 to the target application 1100, and/or 3) displaying the registered links at the target application 1100.

Example scheduling data may include conditions for the remote system 100 to provide the links to user devices 106. These conditions may include when to provide the registered links to the user devices (e.g., a start date and/or end date for sending the registered links to user devices). The conditions may also indicate which devices are to receive the registered links based on geolocation of the user device, region of the user device (e.g., different links for different languages, such as English, Spanish, etc.), and/or other parameters of the user devices. Example scheduling data may also include conditions for the app modules 102 to register the registered links with the target applications 1100. These conditions may include when to register the registered links with the target applications, such as a start date and/or end date for registering the registered links with the target application.

Example scheduling data may include conditions for the target application 1100 to show the registered links to the user in the target application 1100. The conditions for showing the registered links in the target application may depend on the types of functionality provided by the target application as well as the extent to which the developers of the target application provide for the handling of registered links. Example conditions for the target application to show the registered links may include the time for showing the registered links (e.g., a start date and/or end date) and/or a location for showing the registered links (e.g., specific pages for showing the registered links). In the case the target application is a search application, the scheduling data may include search-specific data that indicates when to show the registered link as a search result. For example, the search specific data may include one or more keyword terms that should be present as user-entered search query terms in order to include the registered link in the search results. The registered links may also include other scheduling conditions. For example, in the case the registered links are advertisements, the registered links may include a bid price for showing the links.

In block 1202, the remote system stores the generated registered links at the remote system 100 in a remote registered link data store 1110. In block 1204, the registered link system 1102 (e.g., link transfer module 1112) transfers the registered link to the app module 102. In some implementations, the app module 102 may include a link request module 1114 that requests registered links from the registered link system 1102. The link request module 1114 may request registered links in response to a variety of conditions. In some implementations, the link request module 1114 may request registered links in response to initialization of the app module (e.g., upon application open). The transfer of the registered links from the registered link system 1102 to the app module 102 may be subject to other conditions described herein (e.g., start/end dates). Although the app module 102 may request links from the registered link system 1102, in other implementations, the registered link system 1102 may initiate the transfer of registered links to the app module 102 (e.g., the registered link system may first query the app module to determine whether to send the registered links).

In block 1206, the app module 102 (e.g., link registration module 1116) registers the registered link with the target application 1100. In some implementations, the app module 102 may immediately register the registered link with the target application 1100 upon receipt of the registered link from the remote system 100. For example, upon initialization of the app module, the app module may request a registered link from the remote system and immediately register the received registered link with the target application. In some implementations, the app module may store the registered link in a local registered link data store 1118 and register the registered link at a later time (e.g., subject to registration conditions, such as scheduling data described herein). Registration of the registered link may also be subject to conditions imposed by the target application, such as the features of a target application API (e.g., conditions for when and how registered links may be registered at the target application).

In block 1208, the app module 102 may record the registration event (e.g., in the event list 404 or other location). For example, the app module may record the registered link that was registered, along with any data associated with the registered link, such as the time the registered link was registered, the conditions that were satisfied for registration, etc. In block 1210, the user opens the target application and accesses the registered link. For example, the target application may render the registered link (e.g., as a search result) for the user to select. In some cases, the user may view and/or select (e.g., touch/click) the registered link. In FIG. 13, the user views the registered link 1302 as a search result. In block 1212, the partner application 104 receives the registered link selection event and responds to the event. For example, selection of the registered link by the user may cause the partner application to launch on the user device and access an application page associated with the registered link.

The app module 102 may update the event list 404 or other registered link performance data to include the registered link selection event. The app module may include any of the data associated with the registered link in the event list 404. For example, the app module may include a registered link identifier that identifies the registered link. The registered link identifier may identify the specific registered link to the partner for tracking when the registered link was registered and when the registered link was selected. The registered link data stored in the event list 404 may also include data indicating the circumstances associated with providing the registered link to the user in the target application. For example, the registered link data in the event list 404 may include a time that the link was shown to the user. As another example, if the registered link was surfaced in a target search application (e.g., as a search result), the registered link data in the event list may include search data associated with showing the registered link in the target application, such as a keyword that caused the registered link to be shown in search results, a rank of the registered link in the search results, etc. The registered link data stored in the event list 404 described herein is only example data that may be stored. The data may vary depending on the type of target application that provides the registered link to the user.

In addition to logging selection of a registered link by a user, in some implementations, the target application may provide additional performance parameters associated with the registered link. For example, a target application may indicate when the registered link was viewed by a user, but not opened. In a specific example, if the target application is a search application, the target application may report data indicating a number of times the registered link was provided in search results, the keywords that caused the registered link to be shown, the ranking of the registered link in the results, as well as other search-related data.

In block 1214, the app module 102 reports data associated with the registered link to the remote system 100. The app module 102 may report any of the data associated with the registered link, such as data indicating when the registered link was registered with the target application, data associated with selection of the registered link, etc. In some implementations, the app module 102 may include the registered link data in with other data in the event list. In some implementations, the app module may aggregate the registered link data and/or include the registered link data in attribution data sent to the remote system 100. As described herein, performance data associated with the registered link may include, but is not limited to: 1) when the link was sent to the user device from the remote system, 2) when the link was registered, 3) a name of the target application, 4) when the partner application was opened using the link (e.g., one or more times), and/or 5) target application specific data (e.g., a number of times a link was shown, a search query that surfaced the link, result rankings, etc.). In block 1216, the remote system 100 reports the registered link data to a partner computing device 1104 (e.g., in a partner dashboard).

In some implementations, the partner may interact with the dashboard to modify registered link behavior. For example, a partner may send instructions/data (e.g., updated scheduling data) that may be implemented by the app module and/or target application to change any of the registered link data described herein. In another example, the partners may provide instructions/data that may cause the app module and/or target application to delete the registered links.

FIG. 13 illustrates example operations of the registered link system 1102, app module 102, and target application 1100. In FIG. 13, the partner generates a registered link for a pair of shoes that may be surfaced in search results of a target application that includes search functionality. In some implementations, the target application in FIG. 13 may be a search application. In some implementations, the target application in FIG. 13 may be an application that includes search functionality used to search for content within the application. In some implementations, the target application in FIG. 13 may be a search component of an OS.

In FIG. 13, the partner provides shoe link generation data to the registered link system 1102. The shoe link generation data may include a URI/URL, display data, scheduling data, and search keywords, as described herein. The registered link system 1102 transfers the shoe link to the app module 102 (e.g., in response to a request from the app module 102 upon partner application startup). The app module 102 registers the shoe link with the target application. The GUI 1300 on the user device of FIG. 13 illustrates a user search interface in which a user searches for "shoes." The registered link for shoes 1302 is included in the search results among four other search results for shoes in four different applications (e.g., App1, App2, App3, and App4).

In FIG. 13, the user selects the shoes registered link 1302 in the search results and accesses the partner application 104 (partner application interface is not illustrated). The app module 102 logs the user selection of the shoes registered link in the shoe link performance data 1304. The shoe link performance data 1304 may indicate a number of times the shoes registered link was selected as well as the timestamps for selection. The shoe link performance data 1304 may also include other performance data, such as the search terms used to surface the shoes link (e.g., search terms used when the link was selected and/or viewed), other search result parameters (e.g., the ranking for the link), and/or other performance data (e.g., attribution data). The app module may provide the shoe link performance data 1304 to the remote system 100. The partner computing device 1104 may retrieve the shoe link performance data from the remote system 100. Although registration for a single registered link is illustrated in FIG. 13, a single partner may register a plurality of links.

Figure 14:
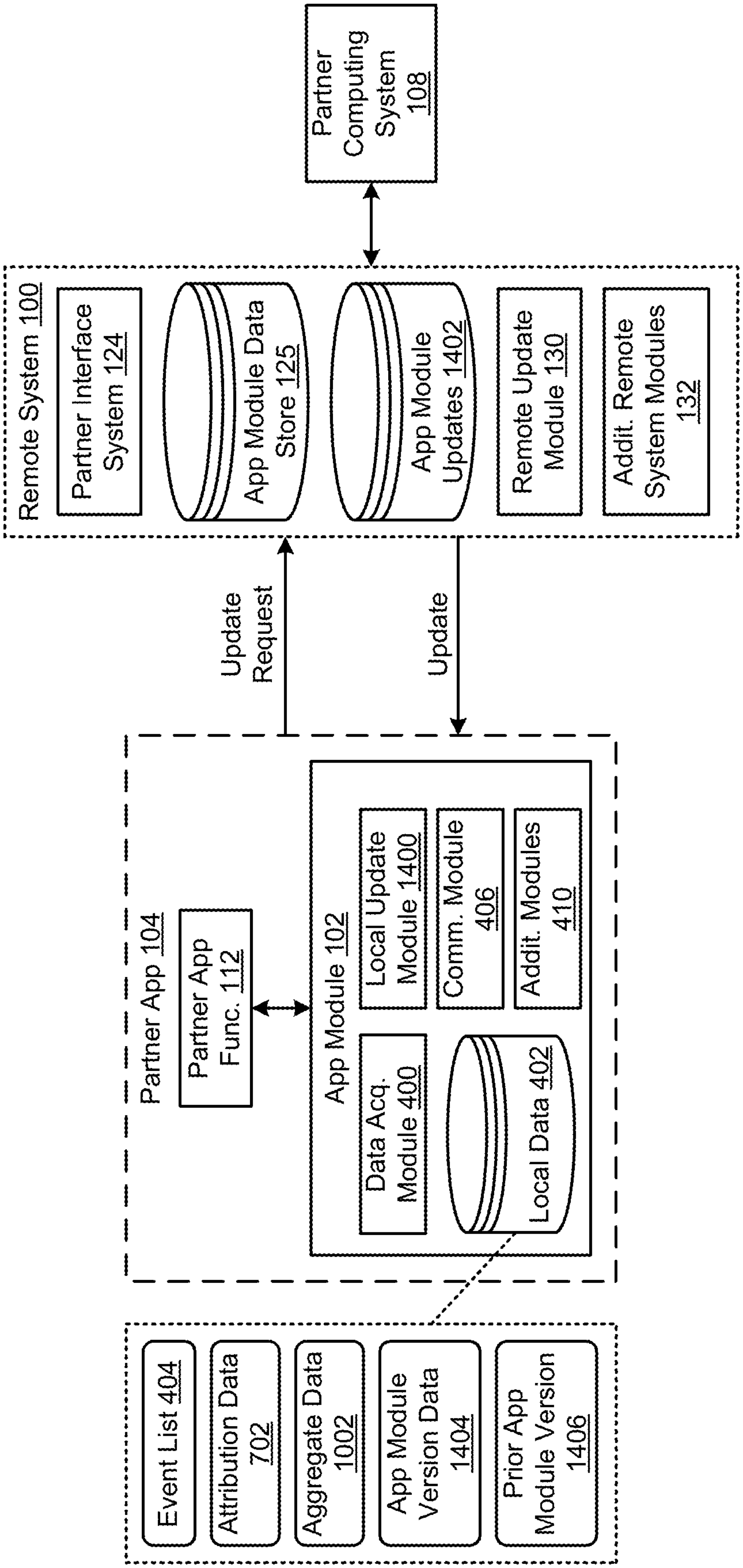
FIG. 14 illustrates an example application module that includes a local update module that updates the application module.

FIG. 14 illustrates an example app module 102 that includes a local update module 1400. The local update module 1400 may receive and apply app module updates from the remote system 100. The remote system 100 includes a remote update module 130 that may generate updates, determine which updates to send to the local update module 1400, and transfer the updates to the local update module 1400. In some implementations, the remote system 100 may initiate app module updates. For example, the remote update module 130 may indicate to the local update module 1400 that updates are available. In some implementations, the app module 102 (e.g., local update module 1400) may request the app module updates from the remote system 100. The app module updates may be stored in an app module update data store 1402.

The app module updates may include updated instructions and/or data for the app module functionality described herein. For example, app module updates may include updates to the event logging functionality, event capping functionality, attribution functionality, data aggregation functionality, and/or the registered link functionality. In some implementations, the app module updates may include updated instructions that modify operation of the event capping module 408, attribution module 700, event processing module 1000, link registration module 1116, and/or other modules. In some implementations, the app module updates may modify data structures (e.g., database structures) and/or other data included in the app module 102 described herein, such as a local event list 404.

The content of the app module updates may depend on the nature of the changes to be made to the app module 102. In some implementations, the app module updates may modify the algorithms implemented by the modules in the app module 102. For example, an app module update may add/delete/modify instructions associated with the app module 102. In a specific example, an update may add new functions, such as functions in addition to event capping and attribution. In another specific example, an update may delete functions, such as the event capping function and/or the attribution function. As another example, an update may add new databases, delete databases, and/or modify existing database structures. An update may also add, delete, and/or modify existing data in the databases.

With respect to the event capping module 408, an app module update may modify the types of events to be capped, the numbers of events to be capped, the time windows for capping, the exclusion list 502, or other instructions and data structures associated with event capping. In some implementations, the event capping module 408 may use a set of databases, such as the local event data and a configuration database. A configuration database may define capping configurations (e.g., time windows, event types capped, etc.). The set of databases used by the event capping module 408 may be updated over time. In some implementations, the event capping module 408 may include business logic that may be updated. In some implementations, the event capping module 408 may include settings that may be updated. Example settings may include a setting for how often the app module 102 requests updates from the remote system 100.

The app module 102 may include version data 1404 (e.g., one or more version IDs, numbers, and/or dates) associated with the different functionalities. For example, the app module 102 may include one or more version IDs that indicate the versions of various functions, data structures, and/or data used for event capping, attribution, and other functionalities. In some implementations, the app module 102 may have a single version ID. In these implementations, the content of the app module 102 may be indicated by a single version ID. In some implementations, different app module functions may have different version IDs. For example, the event capping module 408 and the attribution module 700 may each have associated version IDs. In these implementations, the local/remote update modules 1400, 130 may determine which functions should be updated separate from one another.

In some implementations, a single app module function, such as event capping, may have different version IDs for different components. For example, the event capping functionality may have different version IDs for different instructions, data structures, etc. In these implementations, the update modules 1400, 130 may determine which of the different components for event capping should be updated separately from one another. For example, with respect to event capping, each database may include different version IDs. As another example, the business logic associated with event capping may have a separate version ID. As another example, settings associated with event capping may have a separate version ID. In cases where each component of the event capping functionality has individual version IDs, the update modules 1400, 130 may be configured to update each component separately. For example, the update modules 1400, 130 may update individual components, instead of updating the entire app module 102.

The app module 102 may be initially included in a partner application 104 with an initial state. For example, the initial state may include components with version IDs that are up to date as of the time the app module 102 is included into the partner application 104 (e.g., prior to distribution by the digital distribution platforms). The local update module 1400 may request updates from the remote update module 130 over time in order to update the app module 102 to a more current state (e.g., as developers make changes to the app module 102). In some implementations, an error in a current version may cause the app module 102 to revert to a prior working version. For example, the app module 102 may store a prior working app module version 1406 (e.g., the initial state) in order to fall back onto the prior version in the case an update does not function properly.

The local update module 1400 may request updates from the remote update module 130 in a variety of ways. For example, the local update module 1400 may request updates: 1) based on a time schedule, 2) each time the partner application is opened, or 3) in another manner. The local update module 1400 may include version information for the different app module components in the update request to the remote update module 130. The remote update module 130 may determine which updates to send to the app module 102 based on the received version data and the most up-to-date version data at the remote system 100 (e.g., in the app module update data store 1402). For example, the remote update module 130 may be configured to send updates for components of the app module 102 that are out of date (e.g., having an earlier version number). In some implementations, the remote update module 130 may provide updates only for the components of the app module 102 that are out of date (e.g., the updates are "deltas" in the module functionalities/data). In some implementations, the remote update module 130 may provide updates to entire modules (e.g., the entire module may be replaced). In some implementations, the remote update module 130 may provide updates to the entire app module 102.

Updates to the app module functionality may differ from updates to the partner application 104 or other typical applications. For example, updates to typical applications may require a reinstallation of the application, whereas updates to some functionality of the app module 102 may include updates to the configurable data included in the app module 102. Updating the configurable functions (e.g., algorithms) and data associated with the app module 102 may occur while the partner application 104 is running (e.g., being executed) on the user device 106. Additionally, falling back onto previous configurations of the app module 102 (e.g., in the case of errors with the app module 102) may occur while the partner application 104 is running on the user device.

In some implementations, an update to a typical application may require a restarting of the application and/or rebooting of the user device. An update to the app module functionality may not require that the app module or partner application be restarted. In some cases, the app module may be updated more frequently than the partner application. For example, the partner application may take weeks or months for updates, while the app module may receive updates at a greater rate (e.g., multiple app module updates per single partner application update). Such an asynchronous update cycle difference between the partner application and app module may allow the app module developer to provide up to date functionality to a user without relying on general partner application updates. In some cases, the shorter update cycle for the app module functionality may allow the app module provider to update/tweak algorithms and data more often to provide a better user experience. The updates to the app module may also be provided by a different server (e.g., remote system) than updates to the partner application.

In some implementations, the app module 102 may be developed and supported by a party that is different from the party that develops and supports the partner application 104 including the app module 102. For example, a partner application may be developed by a first party, while the app module is developed and supported by a second party. The first and second parties may operate different servers that provide updates for their respective applications/modules.

For example, the app module functionality may be updated by a party that is different than the partner application developer.

Different configurations of the app module 102 are illustrated herein. The app module 102 may be implemented in different ways by different partners. For example, different partners may implement more/fewer features and/or implement the same types of functionality in a different manner (e.g., implement different event capping functionality). The updates provided by the remote system 100 may also vary among partners, such that different partner application app modules may receive different updates.

Figure 15:
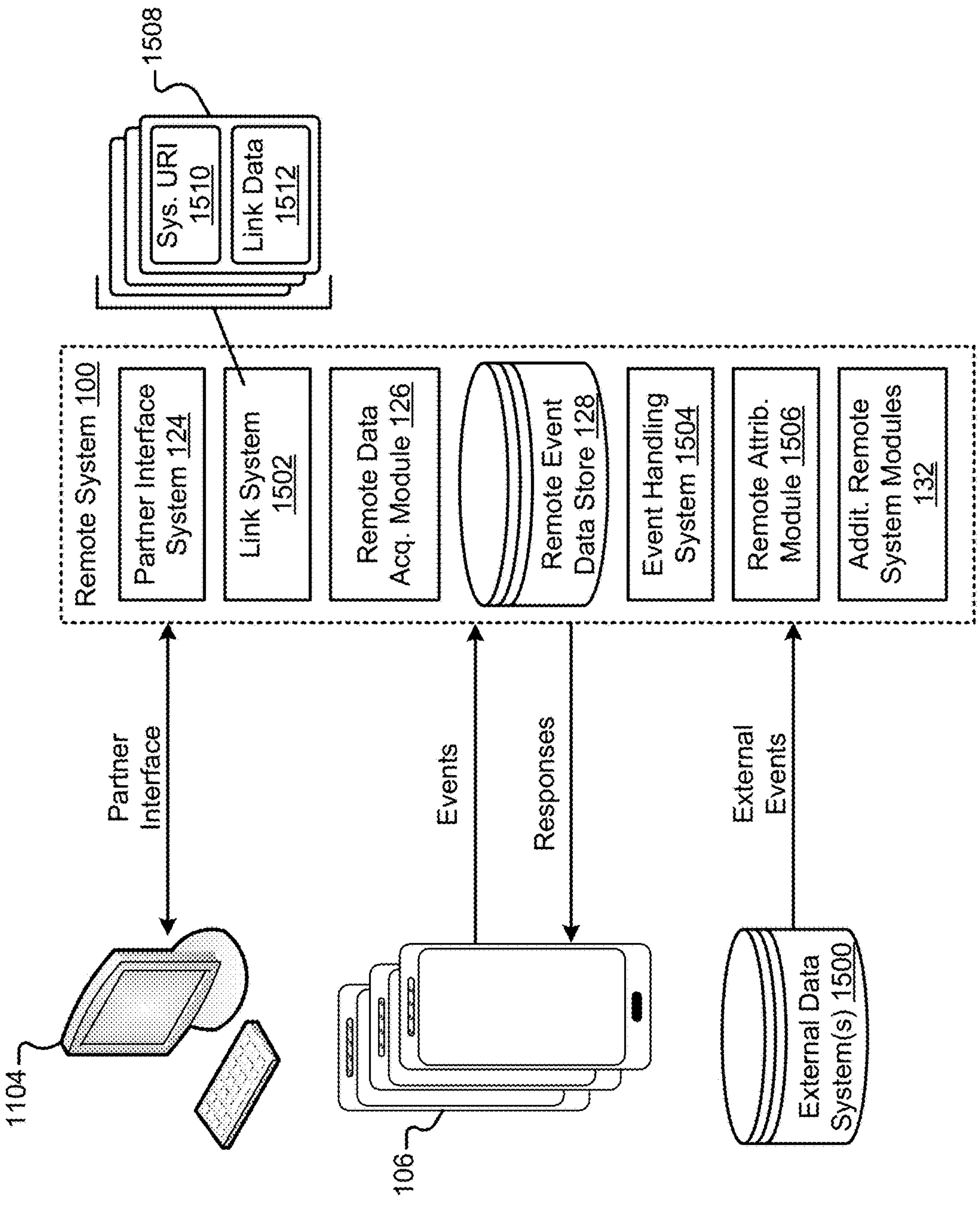
FIG. 15 illustrates an example remote system that includes a link system, an event handling system, and a remote attribution module.

FIG. 15 illustrates an example remote system 100 that includes additional functionality (e.g., a link system 1502, an event handling system 1504, and a remote attribution module 1506). As described herein the remote system 100 may receive app event data generated by user devices while users are using applications. Additionally, in some implementations, the remote system 100 may receive web event data from web event modules when users interact with webpages (e.g., webpages on a partner website). The environment of FIG. 15 includes one or more external data systems 1500 that may represent computing systems that provide event data ("external event data") to the remote system 100. The external data systems 1500 may be provided by parties other than the partners and the operator of the remote system 100. In some implementations, the external data systems 1500 may be operated by businesses that provide data management and analytics services (e.g., to the partners, the remote system, and other parties). The external data systems 1500 may collect additional data (e.g., in addition to the remote system) regarding how users are using the partners' applications and websites.

The remote system 100 may include a remote event data store 128 that stores the web and app event data for different user devices. For example, the remote system 100 may store user data objects that indicate how a person uses a web browser and multiple applications on a single user device (e.g., a smartphone). In a more specific example, a single user data object may include data indicating how a person interacts with a partner's website and application. The remote system may update the user data objects as new event data is received.

In some cases, since a single user device may generate multiple device IDs (e.g., web IDs and/or advertising IDs), the remote system 100 may store multiple user data objects for a single device. For example, the remote system may store two user data objects associated with the same user device, where one user data object is associated with a web ID (e.g., a browser cookie ID) and another user data object is associated with another type of device ID (e.g., an advertising ID). The user data object associated with the web ID may represent a user's web browsing on the user device (e.g., browsing on a partner's website and/or other websites). The user data object associated with the advertising ID may represent the user's application usage on the user device (e.g., usage across multiple applications other than the web browser).

The remote system 100 may include matching functionality that identifies different user data objects (e.g., user data objects with different device IDs) that belong to the same user device. For example, the remote system may match two user data objects based on data including, but not limited to, the Internet Protocol (IP) addresses of the user devices, OS names, OS versions, device types, screen resolutions, and user identification data (e.g., a username). The remote system may combine user data object data (e.g., event data) from matching user data objects into a single user data object. In some implementations, the remote system may receive event data that indicates that the user data objects are from the same user device. For example, the remote system may receive an event including multiple device IDs (e.g., a web ID and an advertising ID), which indicates that user data objects associated with the multiple device IDs are from the same user device.

The remote system 100 may include a remote attribution module 1506 that can use the user data objects to make a variety of decisions described herein, such as attribution decisions. For example, the remote attribution module 1506 may determine that an event is attributable to one or more prior events (e.g., an app event is attributable to one or more prior app/web events). In one example, the remote attribution module 1506 may attribute the installation of an application to a prior user selection of a link, such as a hyperlink on a webpage or a banner advertisement. As another example, the remote attribution module 1506 may attribute the purchase of an item on a website and/or application to a previously selected link. The remote system may update a user data object to indicate that an event is attributable to a prior event.

In some implementations, the remote system 100 may include an event handling system 1504. The event handling system 1504 can provide event responses to received event data. The response provided by the event handling system 1504 to the user device can vary, depending on a variety of factors described herein. In some cases, the event handling system 1506 may route the user device (e.g., web browser and/or application) in response to a received event. In some cases, the event handling system 1504 may transfer data to the user device in response to a received event. In some cases, the event handling system 1504 may send an acknowledgement of receipt of the event. In other cases, the event handling system 1504 may refrain from providing a response to the user device or return a default response.

In some cases, the event handling system 1504 can leverage user data objects to provide responses to a user device based on past events generated by the user device, as illustrated by the following example. If a user selects a link for accessing content in an application that the user device does not have installed, the remote system (e.g., remote data acquisition module 126) can log the selection of the link and the event handling system 1504 can redirect the user to download/install the application. Upon opening the newly installed application, the application can transmit an event to the event handling system 1504, which may also be logged. The remote system may match the two user data objects and, based on the match, the event handling system 1504 can direct the opened application to the content linked to by the previously selected link. In this example, the opening of the application and installation of the application may be attributed to the selection of the link.

The remote system 100 may include a link system 1502 that can generate and store data for use in user-selectable system links, such as advertisement links and/or links to shared content. For example, the link system 1502 may generate and store a system link data object 1508 that includes a system link Uniform Resource Identifier 1510 (hereinafter "system URI 1510") and link data 1512. The system URI 1510 may indicate the network location of the system link data object 1508 (e.g., using a domain/path). The system URI 1510 may be included in a user-selectable link (referred to herein as a "system link") in an application or on a website. Example user-selectable links may include hyperlinks, GUI buttons, graphical banners, or graphical overlays.

In response to selection of a system link, a user device may access the event handling system 1504, which may in turn access the link system 1502 in order to prepare a response to the user device. For example, in response to receiving a system URI from a user device, the event handling system 1504 can retrieve link data corresponding to the received system URI and perform a variety of functions based on the retrieved link data. In one example, the event handling system 1504 can redirect the user device based on the link data (e.g., to download the application or to a default location). In another example, the event handling system 1504 may pass the link data (e.g., a discount code, user referral name, etc.) to the user device so that the user device can act based on the link data. The remote system 100 may log the selection of the system links in user data objects and attempt to match the system link selections to other events included in the same user data object or different user data objects.

In some implementations, a partner can request the creation of system URIs from the partner interface system 124. For example, the partner can use the partner dashboard and/or another interface (e.g., an API) provided by the partner interface system 124 to request system URIs for inclusion into system links. Using the partner dashboard, the partner may specify various operations and data to be associated with a system URI. For example, the partner may specify link analytics data, routing data, and other data. The link system 1502 may generate and store a system link data object 1508 based on the operations and data specified by the partner. For example, the link system 1502 may generate a system URI and associate the system URI with link data generated based on the operations and data specified by the partner. The link system 1502 may store the system link data object in a link data store.

The partner interface system 124 may return the system URI to the partner. The partner can include the system URIs in the partner's application/website or on another party's application/website, such as in an advertising network. For example, the partner may include the system URIs in user-selectable system links (e.g., hyperlinks, graphical banners, or graphical overlays). As described herein, the system URI may be used by the user device (e.g., web browser) to access the event handling system 1504.

The partner interface system 124 may provide reporting regarding the data that is acquired and processed at the remote system 100. For example, the partner interface system 124 may provide the partner with reports of the app event data, web event data, remote attribution determinations, event handling, and system link performance. Example data provided by the remote system to the partners may include, but is not limited to, attribution data indicating which events are attributed to other events, application installation data, application usage data, website usage data, and geographical data (e.g., the location of users using the partners' applications, websites, and/or system links).

As described herein, the user device may transmit web event data (e.g., according to a web module) in response to a variety of different user actions. For example, the user device may transmit web event data in response to a user accessing a webpage (referred to as a "webpage view event"). Accessing a webpage may be the start of a web session (e.g., the first webpage access on the site) or a subsequent page view. The user device may also transmit web event data in response to the user adding an item to a shopping cart or the user purchasing an item (referred to generally as "web commerce events"), the user requesting that a system URI be created by the link system 1502 and transmitted back to the user device (e.g., in order to share content), a user performing an action that the web module has been configured by the operator of the remote system to report, and the user performing any other action that the web module has been configured by the partner to report to the remote system (i.e., a custom web event defined by the partner). For example, a partner may define custom events to indicate that a specific webpage or specific piece of content is viewed or shared.

The web event data transmitted by the user device and received by the remote system may include, but is not limited to: 1) a web ID, 2) the website name/ID, which may correspond to the app name/ID or app ID, and 3) device/browser metadata (e.g., user agent data), such as IP address, OS identification data (e.g., OS name, OS version), device type, and screen resolution. The device/browser metadata may be extracted from the user agent sent by the web browser. The web event data may also include user identification data that identifies a user of the website (e.g., a username), source data indicating the source of the web event data, and an event identifier that indicates the type of event. For example, the event identifier may indicate whether the web event is a webpage view event, a commerce event, a link creation event, a sharing event, or a custom event defined by the developer in the web module.

Modules and data stores included in the systems and devices represent features that may be included in the systems and devices of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems may be configured to communicate with a network (e.g., the Internet). The one or more computing devices of the systems may also be configured to communicate with one another (e.g., via a computer network). In some examples, the one or more computing devices of the systems may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems may be distributed across a number of geographic locations.

What is claimed is:

1. A system comprising:

a remote computing system; and a user device configured to execute a partner application including a partner application module, wherein the partner application module is configured to:

acquire a first set of partner application events, wherein each partner application event of the first set of partner application events is associated with a user action in the partner application;

report a first subset of the first set of partner application events to the remote computing system;

refrain from reporting a second subset of the first set of partner application events to the remote computing system based on satisfaction of initial event capping conditions that indicate conditions upon which a partner application event should not be reported to the remote computing system, wherein the initial event capping conditions indicate that partner application events including at least one of specific uniform resource identifier (URI) parameters and specific uniform resource locator (URL) parameters should not be reported to the remote computing system;

receive updated event capping conditions from the remote computing system that are different than the initial event capping conditions;

acquire a second set of partner application events after receiving the updated event capping conditions;

report a first subset of the second set of partner application events to the remote computing system; and refrain from reporting a second subset of the second set of partner application events to the remote computing system based on satisfaction of the updated event capping conditions, wherein the remote computing system is configured to report the first subset of the first set of partner application events and the first subset of the second set of partner application events to a partner device.

2. The system of claim 1, wherein the initial event capping conditions indicate that partner application events that require resolution by the remote computing system should be reported to the remote computing system, wherein resolution by the remote computing system includes the remote computing system directing the partner application to a specific partner application page.

3. The system of claim 1, wherein the initial event capping conditions indicate that partner application events having specified event types should not be reported to the remote computing system, wherein the event types include at least one of partner application open events, partner application install events, partner application reinstallation events, partner application commerce events, partner application page view events, and partner application sign-up events.

4. The system of claim 1, wherein the user device includes an event list that stores historical partner application events, and wherein the initial event capping conditions indicate whether to report partner application events to the remote computing system based on the historical partner application events included in the event list.

5. The system of claim 1, wherein the initial event capping conditions indicate that partner application events that are partner-specified test events should be sent to the remote computing system.

6. The system of claim 1, wherein the partner application module is configured to:
receive the updated event capping conditions while the partner application is being executed on the user device; and
transition from using the initial event capping conditions to using the updated event capping conditions while the partner application is being executed on the user device.

7. The system of claim 1, wherein the partner application module is configured to report the first subset of the first set of partner application events to the remote computing system as aggregated data that indicates a number of partner application events by type of event.

8. The system of claim 1, wherein the partner application module is configured to generate attribution data that attributes the occurrence of one of the partner application events to one or more prior partner application events, and wherein the remote computing system is configured to report the attribution data to the partner device.

9. The system of claim 1, wherein the partner application module is configured to:
receive a partner-generated link from the remote computing system, wherein the partner-generated link is configured to access an application page in the partner application;
send the partner-generated link to a target application installed on the user device;
determine that the partner-generated link has been selected in the target application by detecting a partner application open event caused by the partner-generated link; and
report, to the remote computing system, that the partner-generated link has been selected in the target application.

10. A system comprising:
a first non-transitory computer-readable medium comprising first computer-readable instructions configured to be included in a partner application on a user device, the first computer-readable instructions causing a processing unit of the user device to:
acquire a first set of partner application events, wherein each partner application event of the first set of partner application events is associated with a user action in the partner application;
report a first subset of the first set of partner application events to a remote computing system;
refrain from reporting a second subset of the first set of partner application events to the remote computing system based on satisfaction of initial event capping conditions that indicate conditions upon which a partner application event should not be reported to the remote computing system, wherein the initial event capping conditions indicate that partner application events including at least one of specific uniform resource identifier (URI) parameters and specific uniform resource locator (URL) parameters should not be reported to the remote computing system;
receive updated event capping conditions from the remote computing system that are different than the initial event capping conditions;
acquire a second set of partner application events after receiving the updated event capping conditions;
report a first subset of the second set of partner application events to the remote computing system; and
refrain from reporting a second subset of the second set of partner application events to the remote computing system based on satisfaction of the updated event capping conditions; and
a second non-transitory computer-readable medium comprising second computer-readable instructions configured cause a processing unit of the remote computing system to report the first subset of the first set of partner application events and the first subset of the second set of partner application events to a partner device.

11. The system of claim 10, wherein the initial event capping conditions indicate that partner application events that require resolution by the remote computing system should be reported to the remote computing system, wherein resolution by the remote computing system includes the remote computing system directing the partner application to a specific partner application page.

12. The system of claim 10, wherein the initial event capping conditions indicate that partner application events having specified event types should not be reported to the remote computing system, wherein the event types include at least one of partner application open events, partner application install events, partner application reinstallation events, partner application commerce events, partner application page view events, and partner application sign-up events.

13. The system of claim 10, wherein the user device includes an event list that stores historical partner application events, and wherein the initial event capping conditions indicate whether to report partner application events to the remote computing system based on the historical partner application events included in the event list.

14. The system of claim 10, wherein the initial event capping conditions indicate that partner application events that are partner-specified test events should be sent to the remote computing system.

15. The system of claim 10, wherein the first computer-readable instructions are configured to cause the processing unit of the user device to:
receive the updated event capping conditions while the partner application is being executed on the user device; and
transition from using the initial event capping conditions to using the updated event capping conditions while the partner application is being executed on the user device.

16. The system of claim 10, wherein the first computer-readable instructions are configured to cause the processing unit of the user device to report the first subset of the first set of partner application events to the remote computing system as aggregated data that indicates a number of partner application events by type of event.

17. The system of claim 10, wherein the first computer-readable instructions are configured to cause the processing unit of the user device to generate attribution data that attributes the occurrence of one of the partner application events to one or more prior partner application events, and wherein the second computer-readable instructions are configured to cause the processing unit of the remote computing system to report the attribution data to the partner device.

18. The system of claim 10, wherein the first computer-readable instructions are configured to cause the processing unit of the user device to:

receive a partner-generated link from the remote computing system, wherein the partner-generated link is configured to access an application page in the partner application;

send the partner-generated link to a target application installed on the user device;

determine that the partner-generated link has been selected in the target application by detecting a partner application open event caused by the partner-generated link; and report, to the remote computing system, that the partner-generated link has been selected in the target application.

19. A system comprising:

a remote computing system; and a user device configured to execute a partner application including a partner application module, wherein the partner application module is configured to:

acquire a first set of partner application events, wherein each partner application event of the first set of partner application events is associated with a user action in the partner application;

report a first subset of the first set of partner application events to the remote computing system;

refrain from reporting a second subset of the first set of partner application events to the remote computing system based on satisfaction of initial event capping conditions that indicate conditions upon which a partner application event should not be reported to the remote computing system;

receive updated event capping conditions from the remote computing system that are different than the initial event capping conditions;

acquire a second set of partner application events after receiving the updated event capping conditions;

report a first subset of the second set of partner application events to the remote computing system; and refrain from reporting a second subset of the second set of partner application events to the remote computing system based on satisfaction of the updated event capping conditions, wherein the remote computing system is configured to report the first subset of the first set of partner application events and the first subset of the second set of partner application events to a partner device, wherein the partner application module is further configured to generate attribution data that attributes the occurrence of one of the partner application events to one or more prior partner application events, and wherein the remote computing system is configured to report the attribution data to the partner device.

20. The system of claim 19, wherein the partner application module is further configured to:

receive a partner-generated link from the remote computing system, wherein the partner-generated link is configured to access an application page in the partner application;

send the partner-generated link to a target application installed on the user device;

determine that the partner-generated link has been selected in the target application by detecting a partner application open event caused by the partner-generated link; and report, to the remote computing system, that the partner-generated link has been selected in the target application.

* * * * *